United States Patent
Lipkens et al.

(10) Patent No.: US 9,827,511 B2
(45) Date of Patent: Nov. 28, 2017

(54) ACOUSTOPHORETIC DEVICE WITH UNIFORM FLUID FLOW

(71) Applicant: FloDesign Sonics, Inc., Wilbraham, MA (US)

(72) Inventors: Bart Lipkens, Hampden, MA (US); Brian McCarthy, Ludlow, MA (US); Jason Barnes, Westfield, MA (US); Dane Mealey, Springfield, MA (US); Ben Ross-Johnsrud, Wilbraham, MA (US); Walter M. Presz, Jr., Wilbraham, MA (US); Kedar Chitale, West Hartford, CT (US)

(73) Assignee: FLODESIGN SONICS, INC., Wilbraham, MA (US)

( * ) Notice: Subject to any disclaimer, the term of this patent is extended or adjusted under 35 U.S.C. 154(b) by 29 days.

(21) Appl. No.: 14/791,115

(22) Filed: Jul. 2, 2015

(65) Prior Publication Data

US 2016/0002070 A1    Jan. 7, 2016

Related U.S. Application Data

(60) Provisional application No. 62/020,088, filed on Jul. 2, 2014, provisional application No. 62/154,672, filed on Apr. 29, 2015.

(51) Int. Cl.
  *B01D 21/28* (2006.01)
  *B01D 21/00* (2006.01)
(52) U.S. Cl.
  CPC ....... *B01D 21/283* (2013.01); *B01D 21/0045* (2013.01)
(58) Field of Classification Search
  CPC .................................................. B01D 21/283
  (Continued)

(56) References Cited

U.S. PATENT DOCUMENTS

| 2,667,944 A | 2/1954 | Crites |
| 3,555,311 A | 1/1971 | Weber |

(Continued)

FOREIGN PATENT DOCUMENTS

| DE | 30 27 433 A1 | 2/1982 |
| EP | 0 292 470 B1 | 11/1988 |

(Continued)

OTHER PUBLICATIONS

International Search Report for PCT Application No. PCT/US2015/039125.

(Continued)

*Primary Examiner* — Kevin Joyner
*Assistant Examiner* — Holly Mull
(74) *Attorney, Agent, or Firm* — Richard M. Klein; Fay Sharpe LLP

(57) ABSTRACT

An acoustophoresis device which includes a substantially vertical flow path of the fluid mixture in order to improve separation of particles/secondary fluid from a primary fluid is disclosed. The vertical flow path reduces velocity non-uniformities in the acoustic chamber resulting from gravity forces. The device includes an acoustic chamber in which multidimensional acoustic standing waves are generated. The fluid can be introduced into the acoustic chamber using a dump diffuser in which a plurality of inlets enter near the bottom of the acoustic chamber such that flow symmetry reduces both, gravity driven flow non-uniformities, and any flow interference effects between inlet mixture flow into the acoustic chamber and the continuous gravity driven particle cluster drop out.

21 Claims, 23 Drawing Sheets

(58) Field of Classification Search
USPC .................................................... 422/128
See application file for complete search history.

(56) References Cited

U.S. PATENT DOCUMENTS

| | | | |
|---|---|---|---|
| 4,055,491 A | 10/1977 | Porath-Furedi | |
| 4,158,629 A | 6/1979 | Sawyer | |
| 4,165,273 A | 8/1979 | Azarov et al. | |
| 4,173,725 A | 11/1979 | Asai et al. | |
| 4,204,096 A | 5/1980 | Barcus et al. | |
| 4,398,325 A | 8/1983 | Piaget et al. | |
| 4,666,595 A | 5/1987 | Graham | |
| 4,699,588 A | 10/1987 | Zinn et al. | |
| 4,743,361 A | 5/1988 | Schram | |
| 4,759,775 A | 7/1988 | Peterson et al. | |
| 4,983,189 A | 1/1991 | Peterson et al. | |
| 5,225,089 A | 7/1993 | Benes et al. | |
| 5,371,729 A | 12/1994 | Manna | |
| 5,395,592 A | 3/1995 | Bolleman et al. | |
| 5,431,817 A | 7/1995 | Braatz et al. | |
| 5,443,985 A | 8/1995 | Lu et al. | |
| 5,452,267 A | 9/1995 | Spevak | |
| 5,484,537 A | 1/1996 | Whitworth | |
| 5,527,460 A | 6/1996 | Trampler et al. | |
| 5,560,362 A | 10/1996 | Sliwa, Jr. et al. | |
| 5,594,165 A | 1/1997 | Madanshetty | |
| 5,604,301 A | 2/1997 | Mountford et al. | |
| 5,626,767 A | 5/1997 | Trampler et al. | |
| 5,688,405 A | 11/1997 | Dickinson et al. | |
| 5,711,888 A | 1/1998 | Trampler et al. | |
| 5,831,166 A | 11/1998 | Kozuka et al. | |
| 5,902,489 A | 5/1999 | Yasuda et al. | |
| 5,912,182 A | 6/1999 | Coakley et al. | |
| 5,951,456 A | 9/1999 | Scott | |
| 6,090,295 A | 6/2000 | Raghavarao et al. | |
| 6,166,231 A | 12/2000 | Hoeksema | |
| 6,216,538 B1 | 4/2001 | Yasuda et al. | |
| 6,205,848 B1 | 6/2001 | Faber et al. | |
| 6,332,541 B1 | 12/2001 | Coakley et al. | |
| 6,391,653 B1 | 5/2002 | Letcher et al. | |
| 6,487,095 B1 | 11/2002 | Malik et al. | |
| 6,592,821 B1 | 7/2003 | Wada et al. | |
| 6,649,069 B2 | 11/2003 | DeAngelis | |
| 6,763,722 B2 | 7/2004 | Fjield et al. | |
| 6,881,314 B1 | 4/2005 | Wang et al. | |
| 6,929,750 B2 | 8/2005 | Laurell et al. | |
| 6,936,151 B1 | 8/2005 | Lock et al. | |
| 7,010,979 B2 | 3/2006 | Scott | |
| 7,061,163 B2 | 6/2006 | Nagahara et al. | |
| 7,081,192 B1 | 7/2006 | Wang et al. | |
| 7,093,482 B2 | 8/2006 | Berndt | |
| 7,108,137 B2 | 9/2006 | Lal et al. | |
| 7,150,779 B2 | 12/2006 | Meegan, Jr. | |
| 7,186,502 B2 | 3/2007 | Vesey | |
| 7,191,787 B1 | 3/2007 | Redeker et al. | |
| 7,331,233 B2 | 2/2008 | Scott | |
| 7,340,957 B2 | 3/2008 | Kaduchak et al. | |
| 7,373,805 B2 | 5/2008 | Hawkes et al. | |
| 7,541,166 B2 | 6/2009 | Belgrader et al. | |
| 7,601,267 B2 | 10/2009 | Haake et al. | |
| 7,673,516 B2 | 3/2010 | Janssen et al. | |
| 7,837,040 B2 | 11/2010 | Ward et al. | |
| 7,846,382 B2 | 12/2010 | Strand et al. | |
| 7,968,049 B2 | 6/2011 | Takahashi et al. | |
| 8,080,202 B2 | 12/2011 | Takahashi et al. | |
| 8,256,076 B1 | 9/2012 | Feller | |
| 8,266,950 B2 | 9/2012 | Kaduchak et al. | |
| 8,273,253 B2 | 9/2012 | Curran | |
| 8,273,302 B2 | 9/2012 | Takahashi et al. | |
| 8,309,408 B2 | 11/2012 | Ward et al. | |
| 8,319,398 B2 | 11/2012 | Vivek et al. | |
| 8,334,133 B2 | 12/2012 | Fedorov et al. | |
| 8,387,803 B2 | 3/2013 | Thorslund et al. | |
| 8,592,204 B2 | 11/2013 | Lipkens et al. | |
| 8,679,338 B2 | 3/2014 | Rietman et al. | |
| 2002/0134734 A1 | 9/2002 | Campbell et al. | |
| 2003/0195496 A1 | 10/2003 | Maguire | |
| 2003/0209500 A1 | 11/2003 | Kock et al. | |
| 2003/0230535 A1 | 12/2003 | Affeld et al. | |
| 2004/0016699 A1 | 1/2004 | Bayevsky | |
| 2005/0196725 A1 | 9/2005 | Fu | |
| 2006/0037915 A1 | 2/2006 | Strand et al. | |
| 2007/0272618 A1 | 11/2007 | Gou et al. | |
| 2007/0284299 A1 | 12/2007 | Xu et al. | |
| 2008/0011693 A1* | 1/2008 | Li .................... | B01D 17/0211 210/802 |
| 2008/0217259 A1 | 9/2008 | Siversson | |
| 2009/0029870 A1 | 1/2009 | Ward et al. | |
| 2009/0053686 A1 | 2/2009 | Ward et al. | |
| 2009/0098027 A1 | 4/2009 | Tabata et al. | |
| 2009/0178716 A1 | 7/2009 | Kaduchak et al. | |
| 2009/0194420 A1 | 8/2009 | Mariella, Jr. et al. | |
| 2009/0045107 A1 | 12/2009 | Ward et al. | |
| 2009/0295505 A1 | 12/2009 | Mohammadi et al. | |
| 2010/0000945 A1 | 1/2010 | Gavalas | |
| 2010/0078384 A1 | 4/2010 | Yang | |
| 2010/0124142 A1 | 5/2010 | Laugharn et al. | |
| 2010/0192693 A1 | 8/2010 | Mudge et al. | |
| 2010/0193407 A1 | 8/2010 | Steinberg et al. | |
| 2010/0206818 A1 | 8/2010 | Leong et al. | |
| 2010/0255573 A1 | 10/2010 | Bond et al. | |
| 2010/0317088 A1 | 12/2010 | Radaelli et al. | |
| 2010/0323342 A1 | 12/2010 | Gonzalez Gomez et al. | |
| 2010/0330633 A1 | 12/2010 | Walther et al. | |
| 2011/0024335 A1 | 2/2011 | Ward et al. | |
| 2011/0092726 A1 | 4/2011 | Clarke | |
| 2011/0123392 A1 | 5/2011 | Dionne et al. | |
| 2011/0154890 A1 | 6/2011 | Holm et al. | |
| 2011/0166551 A1 | 7/2011 | Schafer | |
| 2011/0262990 A1 | 10/2011 | Wang et al. | |
| 2011/0281319 A1 | 11/2011 | Swayze et al. | |
| 2011/0309020 A1 | 12/2011 | Rietman et al. | |
| 2012/0088295 A1 | 4/2012 | Yasuda et al. | |
| 2012/0325727 A1 | 12/2012 | Dionne et al. | |
| 2012/0328477 A1 | 12/2012 | Dionne et al. | |
| 2012/0329122 A1 | 12/2012 | Lipkens et al. | |
| 2013/0175226 A1 | 7/2013 | Coussios et al. | |
| 2013/0277316 A1 | 10/2013 | Dutra et al. | |
| 2013/0284271 A1 | 10/2013 | Lipkens et al. | |
| 2014/0011240 A1 | 1/2014 | Lipkens et al. | |

FOREIGN PATENT DOCUMENTS

| | | |
|---|---|---|
| EP | 1 254 669 B1 | 11/2002 |
| GB | 2 420 510 A | 5/2006 |
| WO | WO 1987/07178 A1 | 12/1987 |
| WO | WO 02/072234 A1 | 9/2002 |
| WO | WO 2009/111276 A1 | 9/2009 |
| WO | WO 2009/144709 A1 | 12/2009 |
| WO | WO 2010/024753 A1 | 4/2010 |
| WO | WO 2011/023949 A2 | 3/2011 |
| WO | WO 2011/027146 A2 | 3/2011 |
| WO | WO 2011/161463 A2 | 12/2011 |

OTHER PUBLICATIONS

Alvarez et al.; Shock Waves, vol. 17, No. 6, pp. 441-447, 2008.
Benes et al.; Ultrasonic Separation of Suspended Particles, 2001 IEEE Ultrasonics Symposium; Oct. 7-10, 2001; pp. 649-659; Atlanta, Georgia.
Castro; Tunable gap and quantum quench dynamics in bilayer graphene; Jul. 13, 2010; Mathematica Summer School.
Cravotto et al.; Ultrasonics Sonochemistry, vol. 15, No. 5, pp. 898-902, 2008.
Garcia-Lopez, et al; Enhanced Acoustic Separation of Oil-Water Emulsion in Resonant Cavities. The Open Acoustics Journal. 2008, vol. 1, pp. 66-71.
Hill et al.; Ultrasonic Particle Manipulation; Microfluidic Technologies for Miniaturized Analysis Systems, Jan. 2007, pp. 359-378.
Kuznetsova et al.; Microparticle concentration in short path length ultrasonic resonators: Roles of radiation pressure and acoustic streaming; Journal of the Acoustical Society of America, American

(56) References Cited

OTHER PUBLICATIONS

Institute of Physics for the Acoustical Society of America, vol. 116, No. 4, Oct. 1, 2004, pp. 1956-1966, DOI: 1.1121/1.1785831.
Latt et al.; Ultrasound-membrane hybrid processes for enhancement of filtration properties; Ultrasonics sonochemistry 13.4 (2006): 321-328.
Lipkens et al.; Frequency sweeping and fluid flow effects on particle trajectories in ultrasonic standing waves; Acoustics 08, Paris, Jun. 29-Jul. 4, 2008.
Lipkens et al.; Prediction and measurement of particle velocities in ultrasonic standing waves; J. Acoust. Soc. Am., 124 No. 4, pp. 2492 (A) 2008.
Lipkens et al.; Separation of micron-sized particles in macro-scale cavities by ultrasonic standing waves; Presented at the International Congress on Ultrasonics, Santiago; Jan. 11-17, 2009.
Lipkens et al.; The effect of frequency sweeping and fluid flow on particle trajectories in ultrasonic standing waves; IEEE Sensors Journal, vol. 8, No. 6, pp. 667-677, 2008.
Lipkens et al., Macro-scale acoustophoretic separation of lipid particles from red blood cells, The Journal of the Acoustical Society of America, vol. 133, Jun. 2, 2013, p. 045017, XP055162509, New York, NY.
Meribout et a.; An Industrial-Prototype Acoustic Array for Real-Time Emulsion Layer Detection in Oil Storage Tanks; IEEE Sensors Journal, vol. 9, No. 12, Dec. 2009.
Nilsson et al.; Review of cell and particle trapping in microfluidic systems; Department of Measurement Technology and Industrial Electrical Engineering, Div. of Nanobiotechnology, Lund University, P.O. Box 118. Lund, Sweden, Analytica Chimica Acta 649, Jul. 14, 2009, pp. 141-157.
Pangu et al.; Droplet transport and coalescence kinetics in emulsions subjected to acoustic fields; Ultrasonics 46, pp. 289-302 (2007).
Ponomarenko et al.; Density of states and zero Landau level probed through capacitance of graphene; Nature Nanotechnology Letters, Jul. 5, 2009; DOI: 10.1038/NNANO.2009.177.
Seymour et al, J. Chem. Edu., 1990, 67(9), p. 763, published Sep. 1990.
Annex to Form PCT/ISA/206—Communication Relating to the Results of the Partial International Search Report, dated Jul. 18, 2013.
European Search Report of European Application No. 11769474.5 dated Oct. 10, 2012.
International Search Report and Written Opinion dated Dec. 20, 2011, for corresponding PCT application No. PCT/US2011/032181.
International Search Report and Written Opinion dated Feb. 27, 2012, for PCT application No. PCT/US2011/040787.
International Search Report and Written Opinion of International Application No. PCT/US2013/037404 dated Jun. 21, 2013.
International Search Report and Written Opinion of International Application No. PCT/US2013/050729 dated Sep. 25, 2013.
International Search Report for corresponding PCT Application Serial No. PCT/US2014/015382 dated May 6, 2014.
Phys. Org. "Engineers develop revolutionary nanotech water desalination membrane." Nov. 6, 2006. http://phys.org/news82047372.html.
"Proceedings of the Acoustics 2012 Nantes Conference," Apr. 23-27, 2012, Nantes, France, pp. 278-282.
Sony New Release: <http://www.sony.net/SonyInfo/News/Press/201010/10-137E/index.html>.

\* cited by examiner

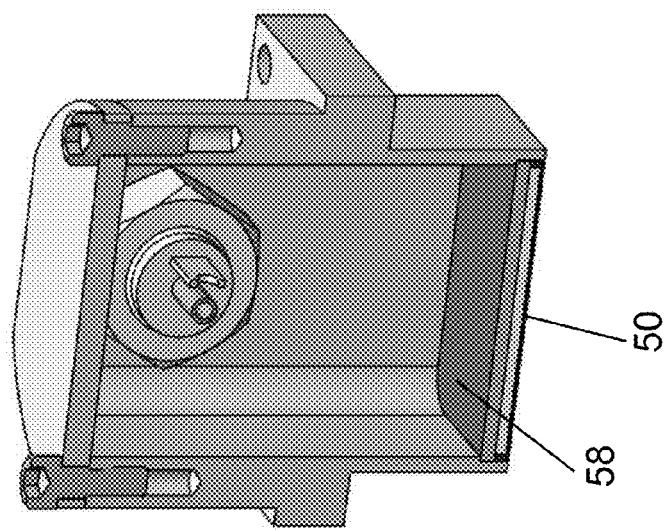
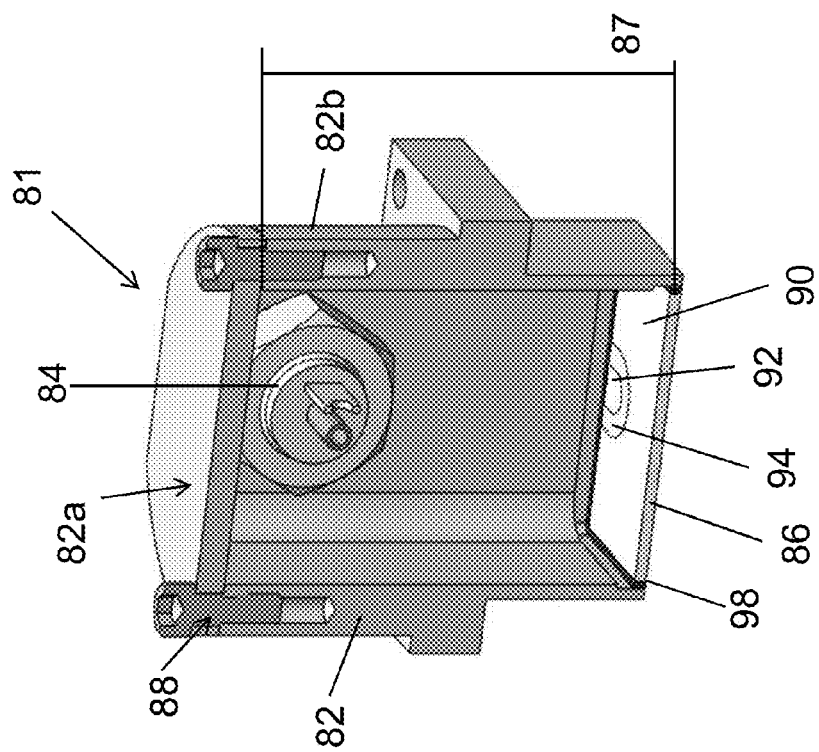

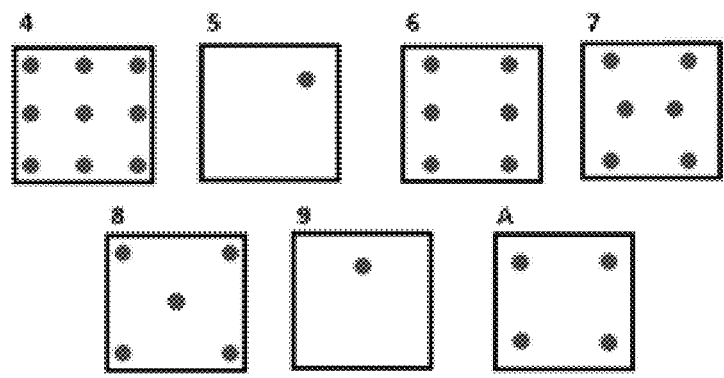
FIG. 15A
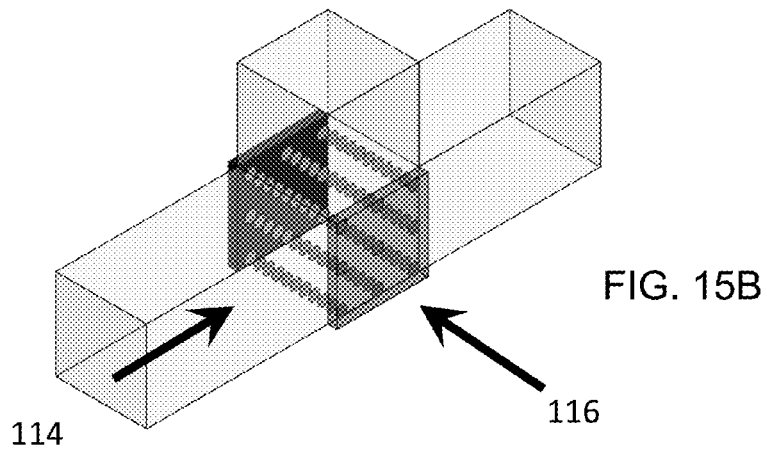
FIG. 15B
114   116
FIG 15C
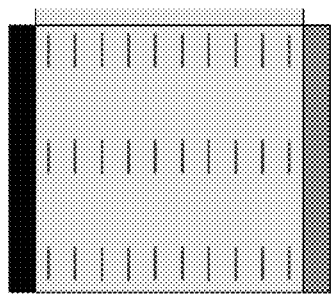
FIG. 15D
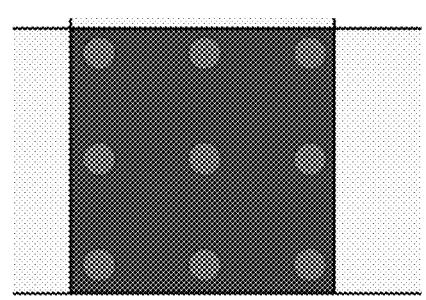

ACOUSTOPHORETIC DEVICE WITH UNIFORM FLUID FLOW

CROSS-REFERENCE TO RELATED APPLICATIONS

This application claims priority to U.S. Provisional Patent Application Ser. No. 62/020,088, filed on Jul. 2, 2014, and to U.S. Provisional Patent Application Ser. No. 62/154,672, filed on Apr. 29, 2015, the disclosures of which are hereby fully incorporated by reference in its entirety.

BACKGROUND

The ability to separate a particle/fluid mixture into its separate components is desirable in many applications. Physical size exclusion filters can be used for this purpose, where the particles are trapped on the filter and the fluid flows through the filter. Examples of physical filters include those that operate by tangential flow filtration, depth flow filtration, hollow fiber filtration, and centrifugation. However, physical filters can be complicated to work with. As the filter fills up, filtration capacity is reduced. Also, using such filters requires periodic stopping to remove the filter and obtain or clear the particles trapped thereon.

Acoustophoresis is the separation of particles and secondary fluids from a primary or host fluid using high intensity acoustic standing waves, and without the use of membranes or physical size exclusion filters. It has been known that high intensity standing waves of sound can exert forces on particles in a fluid when there is a differential in both density and/or compressibility, otherwise known as the acoustic contrast factor. The pressure profile in a standing wave contains areas of local minimum pressure amplitudes at its nodes and local maxima at its anti-nodes. Depending on the density and compressibility of the particles, they will be trapped at the nodes or anti-nodes of the standing wave. The higher the frequency of the standing wave, the smaller the particles that can be trapped due the pressure of the standing wave.

The use of a single planar acoustic standing wave has been used to accomplish this separation process. However, this single, planar wave tends to trap the particles or secondary fluid in a manner such that they can only be separated from the primary fluid by turning off the planar standing wave. This does not allow for continuous operation. Also, the amount of power that is needed to generate the acoustic planar standing wave tends to heat the primary fluid through waste energy.

Conventional acoustophoresis devices have thus had limited efficacy due to several factors including heat generation, limits on fluid flow, and the inability to capture different types of materials. Improved acoustophoresis devices using three dimensional acoustic standing waves combined with improved fluid dynamics which allow the acoustophoresis particle separation process to be a continuous process driven by gravity are presented herein.

BRIEF SUMMARY

The present disclosure relates to acoustophoretic systems with improved fluid dynamics that can be used to improve separation of particles from a particle/fluid mixture. A new mixture with an increased concentration of particles can be obtained, or the particles themselves can be obtained. In more specific embodiments, the particles are biological cells, such as Chinese hamster ovary (CHO) cells, NS0 hybridoma cells, baby hamster kidney (BHK) cells, and human cells.

Briefly, the systems described herein all include a substantially vertical flow path of the mixture through the acoustic chamber in order to improve separation of particles/secondary fluid from a primary fluid using fluid dynamics. The vertical flow path reduces velocity non-uniformities in the acoustic chamber resulting from gravity forces. In additional systems, a dump diffuser is used to make the incoming flow more uniform, so that the efficiency of the acoustophoretic system is maximized. In other systems, baffles (i.e. laminar plates) are used as collection surfaces for the particles/secondary fluid as the primary fluid flows over them.

Disclosed in various embodiments are acoustophoresis devices comprising: a housing having a sidewall that defines an acoustic chamber; at least one upper outlet in the acoustic chamber; a shallow wall leading to at least one lower concentrate outlet below the acoustic chamber; at least one ultrasonic transducer located on the sidewall of the housing; at least one reflector located on the sidewall of the housing opposite the at least one ultrasonic transducer; and at least one diffuser inlet for the inflow of fluid mixture into the acoustic chamber.

The at least one diffuser inlet may be part of a dump diffuser. The at least one diffuser inlet may be located at a height between 0% and 100% of the height of the acoustic chamber, as measured from the bottom. The at least one diffuser inlet can be in the shape of holes or slots that provide a flow direction normal to the axial direction of an acoustic standing wave generated by the at least one ultrasonic transducer. The shallow wall concentrate outlet can serve to collect particle clusters, and may have an angle of 60° or less relative to a horizontal plane. The device may have a circular or rectangular cross-section in a flow direction.

In some particular embodiments, the at least one diffuser inlet is a plurality of diffuser inlets located about the housing so that the device has a vertical plane or line of symmetry and the inflow of fluid is symmetrical. The plurality of diffuser inlets can be fed by a plurality of dump diffusers.

In other particular embodiments, the at least one diffuser inlet is located at an upper end of the acoustic chamber along with the at least one upper outlet. A wall separates the at least one diffuser inlet from the at least one upper outlet such that fluid flows vertically downwards from the at least one diffuser inlet, then horizontally, then vertically upwards to the at least one upper outlet.

Also disclosed are methods of separating a host fluid from a second fluid or particulate carried in suspension. The methods comprise flowing a mixture of the host fluid and the second fluid or particulate in suspension through an acoustophoresis device in a uniform fashion. The device comprises: a housing having a sidewall that defines an acoustic chamber; at least one upper outlet in the acoustic chamber; a shallow wall leading to at least one lower concentrate outlet below the acoustic chamber; at least one ultrasonic transducer located on the sidewall of the housing, the transducer including a piezoelectric material driven by a voltage signal to create a multi-dimensional acoustic standing wave in the acoustic chamber; at least one reflector located on the sidewall of the housing opposite the at least one ultrasonic transducer; and at least one diffuser inlet in the sidewall of the acoustic chamber above the shallow wall concentrate outlet. The methods further comprise capturing smaller particles of the second fluid or particulate in the multi-dimensional acoustic standing wave to cluster and continuously gravity separate the second fluid or particulate from the host fluid; wherein the gravity separated second fluid or particulate subsequently falls into the at least one lower concentrate outlet. The mixture of the host fluid and the second fluid or particulate can be a slurry.

Disclosed in other embodiments herein are acoustophoresis devices, comprising: a housing defining a primary flow channel between an inlet end and an outlet end of the housing; at least one ultrasonic transducer located on a side of the housing; at least one reflector located on the side of the housing opposite the at least one ultrasonic transducer; and at least one baffle extending into the primary flow channel.

The acoustophoresis device can further include a port on a side of the housing between the at least one transducer and the at least one reflector connecting to a secondary flow channel, the at least one baffle extending into both the primary flow channel and the secondary flow channel. The secondary flow channel may be angled relative to the primary flow channel. In particular embodiments, the angle between the primary flow channel and the secondary flow channel is from about 15° to 90°. At least one baffle is generally angled relative to the primary flow channel, but is not angled relative to the secondary flow channel. A collection well may be located in the secondary flow channel downstream of the at least one baffle.

The acoustophoresis device may have a plurality of baffles, arranged in a variety of configurations. The plurality of baffles can be arranged in parallel to each other. The plurality of baffles can extend into the primary flow channel in at least two different distances. The baffles in the plurality of baffles can be arranged in at least two different angles relative to the primary flow channel. The baffles in the plurality of baffles may all have the same length, or may vary in length.

In some embodiments, the primary flow channel is substantially U-shaped. In others, the inlet end and the outlet end are located on opposite ends of the housing, i.e. the primary flow channel is straight.

Also disclosed are methods of separating a second fluid or a particulate from a host fluid, comprising flowing a mixture of the host fluid and the second fluid or particulate through an acoustophoresis device. The device comprises: an acoustic chamber having at least one inlet and at least one outlet that define a primary flow channel; an ultrasonic transducer located on a wall of the acoustic chamber, the transducer including a piezoelectric material driven by a voltage signal to create a multi-dimensional acoustic standing wave in the acoustic chamber; and at least one reflector located on a wall of the acoustic chamber opposite the at least one ultrasonic transducer; and at least one baffle extending into the primary flow channel. The methods further comprise capturing smaller particles of the second fluid or particulate in the multi-dimensional acoustic standing wave to clump, aggregate, and coalesce and continuously gravity separate the second fluid or particulate from the host fluid; wherein the gravity separated second fluid or particulate subsequently contact the at least one baffle and are directed to a collection outlet.

The particulate may be Chinese hamster ovary (CHO) cells, NS0 hybridoma cells, baby hamster kidney (BHK) cells, insect cells or human cells such as stem cells and T-cells. The mixture may be continuously flowed through the acoustic chamber. The standing wave may have an axial force and a lateral force, the lateral force being at least the same order of magnitude as the axial force.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 11 is a cross-sectional diagram of an ultrasonic transducer of the present disclosure. An air gap is present within the transducer, and no backing layer or wear plate is present.

FIG. 12 is a cross-sectional diagram of an ultrasonic transducer of the present disclosure. An air gap is present within the transducer, and a backing layer and wear plate are present.

FIG. 15A illustrates the trapping line configurations for seven of the peak amplitudes of FIG. 14 from the direction orthogonal to fluid flow.

FIG. 15B is a perspective view illustrating the separator. The fluid flow direction and the trapping lines are shown.

FIG. 15C is a view from the fluid inlet along the fluid flow direction (arrow 114) of FIG. 15B, showing the trapping nodes of the standing wave where particles would be captured.

FIG. 15D is a view taken through the transducers face at the trapping line configurations, along arrow 116 as shown in FIG. 15B.

FIG. 26A is a perspective view. FIG. 26B is the view along the width of the plate. FIG. 26C is the view along the length of the plate.

DETAILED DESCRIPTION

Figure 1:
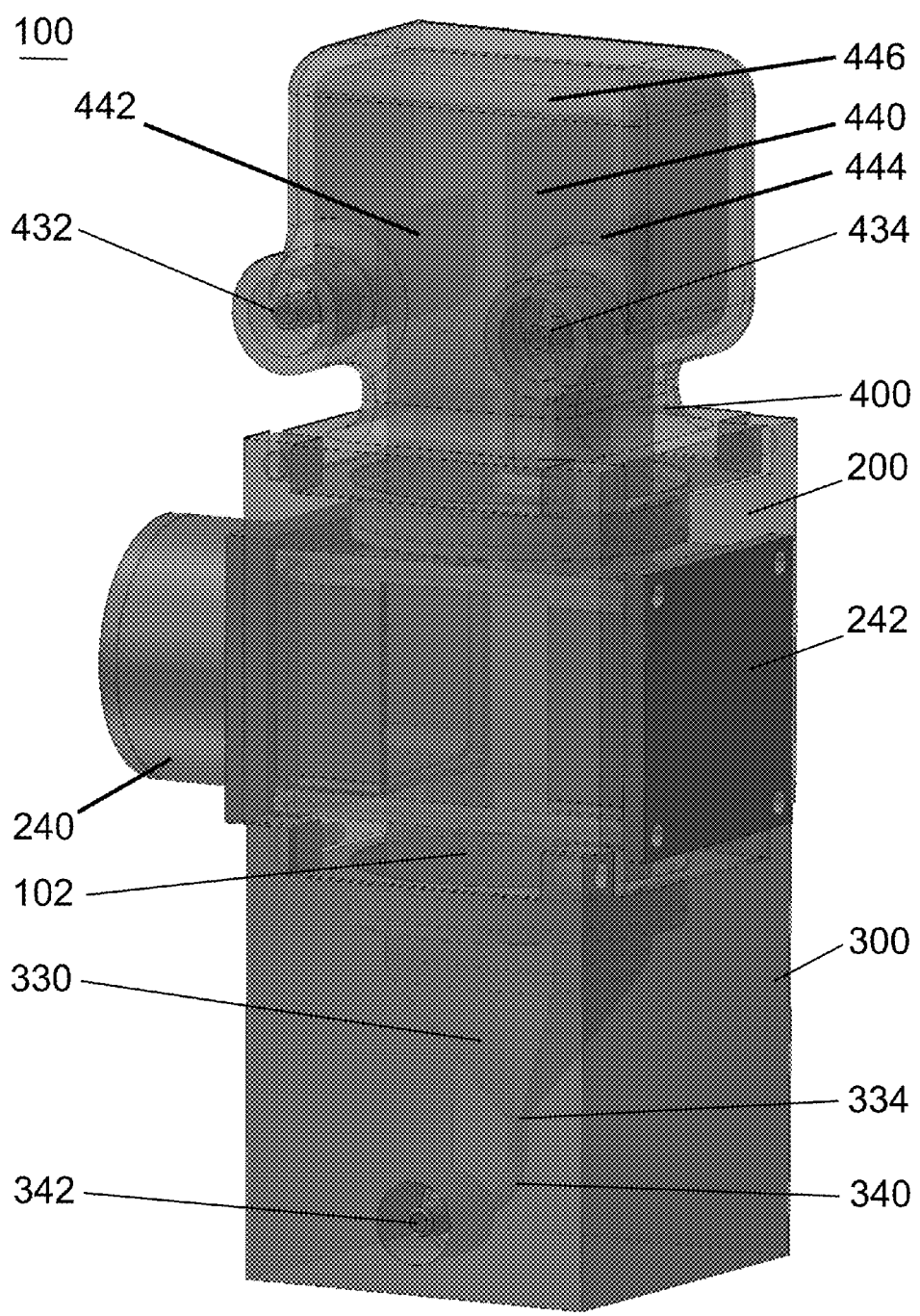
FIG. 1 is an exterior perspective view of a basic acoustophoresis device made from three different modules: an ultrasonic transducer module, a collection well module, and an inlet/outlet module.

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. Furthermore, it should be understood that the drawings are not to scale.

In the figures, interior surfaces are designated by dashed lines in cross-sectional views, unless otherwise noted.

The singular forms "a," "an," and "the" include plural referents unless the context clearly dictates otherwise.

As used in the specification and in the claims, the open-ended transitional phrases "comprise(s)," "include(s)," "having," "contain(s)," and variants thereof require the presence of the named ingredients/steps and permit the presence of other ingredients/steps. These phrases should also be construed as disclosing the closed-ended phrases "consist of" or "consist essentially of" that permit only the named ingredients/steps and unavoidable impurities, and exclude other ingredients/steps.

All numerical values used herein include values that are the same when reduced to the same number of significant figures and values that differ by less than the experimental error of conventional techniques for measuring that value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "substantially" and "about" can be used to include any numerical value that can vary without changing the basic function of that value. When used with a range, they also disclose the range defined by the absolute values of the two endpoints, e.g. "about 2 to about 4" also discloses the range "from 2 to 4." The term "about" may refer to plus or minus 10% of the indicated number.

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component. It should be noted that in a loop, a first component can be described as being both upstream of and downstream of a second component.

The terms "horizontal" and "vertical" are used to indicate direction relative to an absolute reference, i.e. ground level. However, these terms do not require structures to be absolutely parallel or absolutely perpendicular to each other, or to the earth. The terms "upwards" and "downwards" are also relative to an absolute reference; an upwards flow is always against the gravity of the earth.

The term "parallel" should be construed in its lay sense of two surfaces that maintain a generally constant distance between them, and not in the strict mathematical sense that such surfaces will never intersect when extended to infinity.

The present application refers to "the same order of magnitude." Two numbers are of the same order of magnitude if the quotient of the larger number divided by the smaller number is a value less than 10.

The acoustophoretic separation technology of the present disclosure employs ultrasonic acoustic standing waves to trap, i.e., hold stationary, particles or a secondary fluid in a host fluid stream. The particles or secondary fluid collect at the nodes or anti-nodes of the multi-dimensional acoustic standing wave, depending on the particles' or secondary fluid's acoustic contrast factor relative to the host fluid, forming clusters that eventually fall out of the multi-dimensional acoustic standing wave when the clusters have grown to a size large enough to overcome the holding force of the multi-dimensional acoustic standing wave (e.g. by coalescence or agglomeration). This is an important distinction from previous approaches where particle trajectories were merely altered by the effect of the acoustic radiation force. The scattering of the acoustic field off the particles results in a three dimensional acoustic radiation force, which acts as a three-dimensional trapping field. The acoustic radiation force is proportional to the particle volume (e.g. the cube of the radius) when the particle is small relative to the wavelength. It is proportional to frequency and the acoustic contrast factor. It also scales with acoustic energy (e.g. the square of the acoustic pressure amplitude). For harmonic excitation, the sinusoidal spatial variation of the force is what drives the particles to the stable axial positions within the standing waves. When the acoustic radiation force exerted on the particles is stronger than the combined effect of fluid drag force and buoyancy and gravitational force, the particle is trapped within the acoustic standing wave field. This results in concentration, agglomeration and/or coalescence of the trapped particles. The strong lateral forces create rapid clustering of particles. Relatively large solids of one material can thus be separated from smaller particles of a different material, the same material, and/or the host fluid through enhanced gravitational separation.

One specific application for the acoustophoresis device is in the processing of bioreactor materials. It is important to be able to filter all of the cells and cell debris from the expressed materials that are in the fluid stream. The expressed materials are composed of biomolecules such as recombinant proteins or monoclonal antibodies, and are the desired product to be recovered. Through the use of acoustophoresis, the separation of the cells and cell debris is very efficient and leads to very little loss of the expressed materials. This is an improvement over current filtration processes (depth filtration, tangential flow filtration, and the like), which show limited efficiencies at high cell densities, so that the loss of the expressed materials in the filter beds themselves can be up to 5% of the materials produced by the bioreactor. The use of mammalian cell cultures including Chinese hamster ovary (CHO), NS0 hybridoma cells, baby hamster kidney (BHK) cells, and human cells has proven to be a very efficacious way of producing/expressing the recombinant proteins and monoclonal antibodies required of today's pharmaceuticals. The filtration of the mammalian cells and the mammalian cell debris through acoustophoresis aids in greatly increasing the yield of the bioreactor. The acoustophoresis process, through the use of multidimensional acoustic waves, may also be coupled with a standard filtration process upstream or downstream, such as depth filtration using diatomaceous earth, tangential flow filtration (TFF), or other physical filtration processes.

In this regard, the contrast factor is the difference between the compressibility and density of the particles and the fluid itself. These properties are characteristic of the particles and the fluid themselves. Most cell types present a higher density and lower compressibility than the medium in which they are suspended, so that the acoustic contrast factor between the cells and the medium has a positive value. As a result, the axial acoustic radiation force (ARF) drives the cells, with a positive contrast factor, to the pressure nodal planes, whereas cells or other particles with a negative contrast factor are driven to the pressure anti-nodal planes. The radial or lateral component of the ARF is larger than the combined effect of fluid drag force and gravitational force. The radial or lateral component drives the cells/particles to planes where they can cluster into larger groups, which will then gravity separate from the fluid.

As the cells agglomerate at the nodes of the standing wave, there is also a physical scrubbing of the cell culture media that occurs whereby more cells are trapped as they come in contact with the cells that are already held within the standing wave. This generally separates the cells from the cell culture media. The expressed biomolecules remain in the nutrient fluid stream (i.e. cell culture medium).

Desirably, the ultrasonic transducer(s) generate a three-dimensional or multi-dimensional acoustic standing wave in the fluid that exerts a lateral force on the suspended particles to accompany the axial force so as to increase the particle trapping and clumping capabilities of the standing wave. Typical results published in literature state that the lateral force is two orders of magnitude smaller than the axial force. In contrast, the technology disclosed in this application provides for a lateral force to be higher, up to the same order of magnitude as the axial force.

For three-dimensional acoustic fields, Gor'kov's formulation can be used to calculate the acoustic radiation force $F_{ac}$ applicable to any sound field. The primary acoustic radiation force $F_{ac}$ is defined as a function of a field potential U, $$F_A = -\nabla(U),$$

where the field potential U is defined as $$U = V_0 \left[ \frac{\langle p^2 \rangle}{2\rho_f c_f^2} f_1 - \frac{3\rho_f \langle u^2 \rangle}{4} f_2 \right],$$

and $f_1$ and $f_2$ are the monopole and dipole contributions defined by $$f_1 = 1 - \frac{1}{\Lambda \sigma^2},$$
$$f_2 = \frac{2(\Lambda - 1)}{2\Lambda + 1},$$

where p is the acoustic pressure, μ is the fluid particle velocity, Λ is the ratio of cell density $\rho_p$ to fluid density $\rho_f$, σ is the ratio of cell sound speed $c_p$ to fluid sound speed $c_f$, $V_o$ is the volume of the cell, and < > indicates time averaging over the period of the wave. Gor'kov's formulation applies to particles smaller than the wavelength. For larger particle sizes, Ilinskii provides equations for calculating the 3D acoustic radiation forces for any particle size. See Ilinskii, *Acoustic Radiation Force on a Sphere in Tissue*, The Journal of the Acoustical Society of America, 132, 3, 1954 (2012), which is incorporated herein by reference.

Perturbation of the piezoelectric crystal in an ultrasonic transducer in a multimode fashion allows for generation of a multidimensional acoustic standing wave. A piezoelectric crystal can be specifically designed to deform in a multi-mode fashion at designed frequencies, allowing for generation of a multi-dimensional acoustic standing wave. The multi-dimensional acoustic standing wave may be generated by distinct modes of the piezoelectric crystal such as the 3×3 mode that would generate multidimensional acoustic standing waves. A multitude of multidimensional acoustic standing waves may also be generated by allowing the piezoelectric crystal to vibrate through many different mode shapes. Thus, the crystal would excite multiple modes such as a 0×0 mode (i.e. a piston mode) to a 1×1, 2×2, 1×3, 3×1, 3×3, and other higher order modes and then cycle back through the lower modes of the crystal (not necessarily in straight order). This switching or dithering of the crystal between modes allows for various multidimensional wave shapes, along with a single piston mode shape to be generated over a designated time.

It is also possible to drive multiple ultrasonic transducers with arbitrary phasing. In other words, the multiple transducers may work to separate materials in a fluid stream while being out of phase with each other. Alternatively, a single ultrasonic transducer that has been divided into an ordered array may also be operated such that some components of the array will be out of phase with other components of the array.

It may be necessary, at times, due to acoustic streaming, to modulate the frequency or voltage amplitude of the standing wave. This may be done by amplitude modulation and/or by frequency modulation. The duty cycle of the propagation of the standing wave may also be utilized to achieve certain results for trapping of materials. In other words, the acoustic beam may be turned on and shut off at different frequencies to achieve desired results.

The lateral force of the total acoustic radiation force (ARF) generated by the ultrasonic transducers of the present disclosure is significant and is sufficient to overcome the fluid drag force at high linear velocities up to 1 cm/s and beyond. For example, linear velocities through the devices of the present disclosure can be a minimum of 4 cm/min for separation of cells/particles, and can be as high as 1 cm/sec for separation of oil/water phases. Flow rates can be a minimum of 25 mL/min, and can range as high as 40 mL/min to 270 mL/min, or even higher. This is true for batch reactors, fed-batch bioreactors and perfusion bioreactors.

The present disclosure relates to acoustophoretic devices that have improved fluid dynamics for separation of particles/secondary fluid from a primary or host fluid. A U-turn may be present in the flow path of such devices. Baffles (i.e. laminar plates) can also be utilized to increase the concentration of the particles/secondary fluid after being separated from the primary fluid.

The fluid dynamic parameters that are affecting the acoustophoresis separation process may be defined in terms of Reynolds numbers. For instance, the particle Reynolds numbers for particle sizes from one micron to 250 µm with a flow velocity of 4 cm/min to 25 cm/min are from about 0.0005 to 1. The chamber Reynolds numbers for a 1 inch length chamber at a flow rate of 4 cm/min to a 3 inch length chamber at 12 cm/min are about from 10 to 150. The Reynolds numbers based on the inlet tubing diameters of 0.12 inches to 0.31 inches at 30 mL per minute to 540 mL per minute are from about 200 to 1500.

If desired, multiple standing waves from multiple ultrasonic transducers can also be used, which allows for multiple separation stages. For example, in a flow path that runs past two ultrasonic transducers, the first transducer (and its standing wave) will collect a certain amount of the particles, and the second transducer (and its standing wave) will collect additional particles that the first transducer was not able to hold. This construction can be useful where the particle/fluid ratio is high (i.e. large volume of particles), and the separation capacity of the first transducer is reached. This construction can also be useful for particles that have a bimodal or greater size distribution, where each transducer can be optimized to capture particles within a certain size range.

FIG. 1 is an exterior perspective view of a basic acoustophoresis device that includes a U-turn. This basic acoustophoresis device 100 is formed from a kit that includes an ultrasonic transducer module 200, a collection well module 300, and an inlet/outlet module 400. As seen here, the three modules are reversibly interlocked together to form a primary flow channel 102 into which a fluid/particle mixture can be processed to separate the particles from the fluids or to further concentrate the particles within the mixture, and to recover the particles/concentrated mixture. It is noted though that the teachings of the present disclosure are applicable to non-modular acoustophoretic separation devices as well.

Briefly, in FIG. 1 the inlet/outlet module 400 contains an inlet port 432 and an outlet port 434 for the flow path. A fluid/particle mixture is pumped in through the inlet port 432. The mixture flows downwards via gravity and pumping through the ultrasonic transducer module 200, where the particles are trapped and held by the ultrasonic standing wave. As fluid continues to be pumped into the flow path, eventually the collection well module 300 and the ultrasonic transducer module 200 are filled with fluid, and the fluid pressure rises high enough that fluid will flow out through the outlet port 434 at the top of the device.

Referring first to the inlet/outlet module 400, a wall 440 is located between the inlet port 432 and the outlet port 434. Due to the presence of the wall, fluid flows from the inlet port down through the rest of the device and then to the outlet port. The wall essentially divides the primary flow channel into two separate sub-channels, one sub-channel 480 being identified by the inlet port 432 and the wall, and the other sub-channel 482 being identified by the outlet port 434 and the wall. The cross-sectional area of the flow channel for the inlet port can be smaller than, equal to, or greater than the cross-sectional area of the flow channel for the outlet port.

Also visible is a first retainer wall 442 adjacent the inlet port and a second retainer wall 444 adjacent the outlet port. Incoming fluid must flow over the first retainer wall 442 before flowing downwards into the ultrasonic transducer module 200. Similarly, fluid coming back upwards must flow over the second retainer wall 444 before exiting through the outlet port 434. This construction provides a means by which the turbulence of incoming fluid can be reduced, so that the particles trapped in the acoustic standing wave in the ultrasonic transducer module are not disrupted or washed out of the standing wave before aggregating to a sufficient size.

As depicted here, in some embodiments, the wall 440 is spaced apart from the upper end of the housing. This gap 446 forms and acts as a pressure relief passage between the inlet port 432 and the outlet port 434, for example in case the flow path is inadvertently blocked.

An ultrasonic transducer 240 is located on one side of the housing of the ultrasonic transducer module 200, and the reflector 242 is located on the side of the housing opposite the ultrasonic transducer. It should be noted that the ultrasonic transducer is directly adjacent to the primary flow channel, and would be directly exposed to any fluid passing through the primary flow channel.

The particles within the ultrasonic standing wave collect, clump, or agglomerate, and eventually grow to a size where gravity overcomes the acoustic force of the standing wave, and the particle aggregates then fall/sink into the collection well module 300. The collection well module includes a well 330 that tapers downwards in cross-sectional size to a vertex 334. A drain line 340 connects the vertex 334 to a port 342 where the concentrated particles can be drawn out of the well.

The three modules of FIG. 1 are joined together by complementary attachment members that are intended to permit the module to be reversibly joined and form a water-tight seal. The depicted attachment members are intended to be press-fitted together. Of course, other reversible attachment means are contemplated, for example attachment members that include internal or external threads, so that modules are screwed together.

Figure 2:
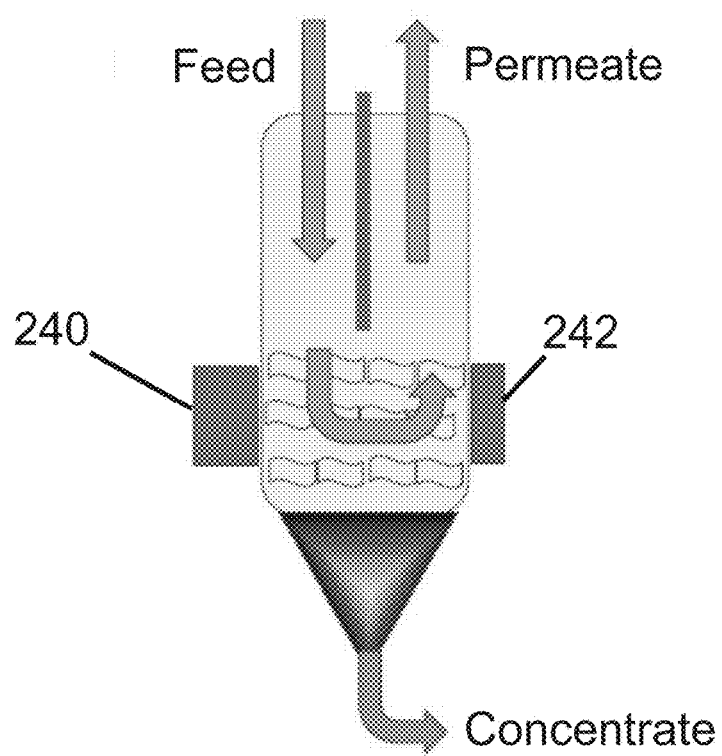
FIG. 2 is a schematic showing the U-shaped flow path of the fluid passing through the device of FIG. 1.

FIG. 2 is a diagram illustrating the nonlinear U-shaped fluid flow path through the device of FIG. 1. The flow in the chamber goes from vertically downwards, to horizontal, and then to vertically upwards. The feed contains the host fluid and the particulate, and is shown as the downwards pointing arrow. The inlet includes a flow distributor for more uniform flow. The feed passes through the acoustic standing waves generated by the ultrasonic transducer 240 and reflector 242, capturing and clustering the particulate. The feed passes through the acoustic standing waves twice before exiting. The fluid exiting the device is the permeate, and contains a lower concentration of particulate compared to the feed. As the particulate grows in size sufficient to overcome the acoustic radiation force, the clusters fall to the bottom of the acoustic chamber. This is the concentrate, which contains a higher concentration of particulate compared to the feed.

Figure 3:
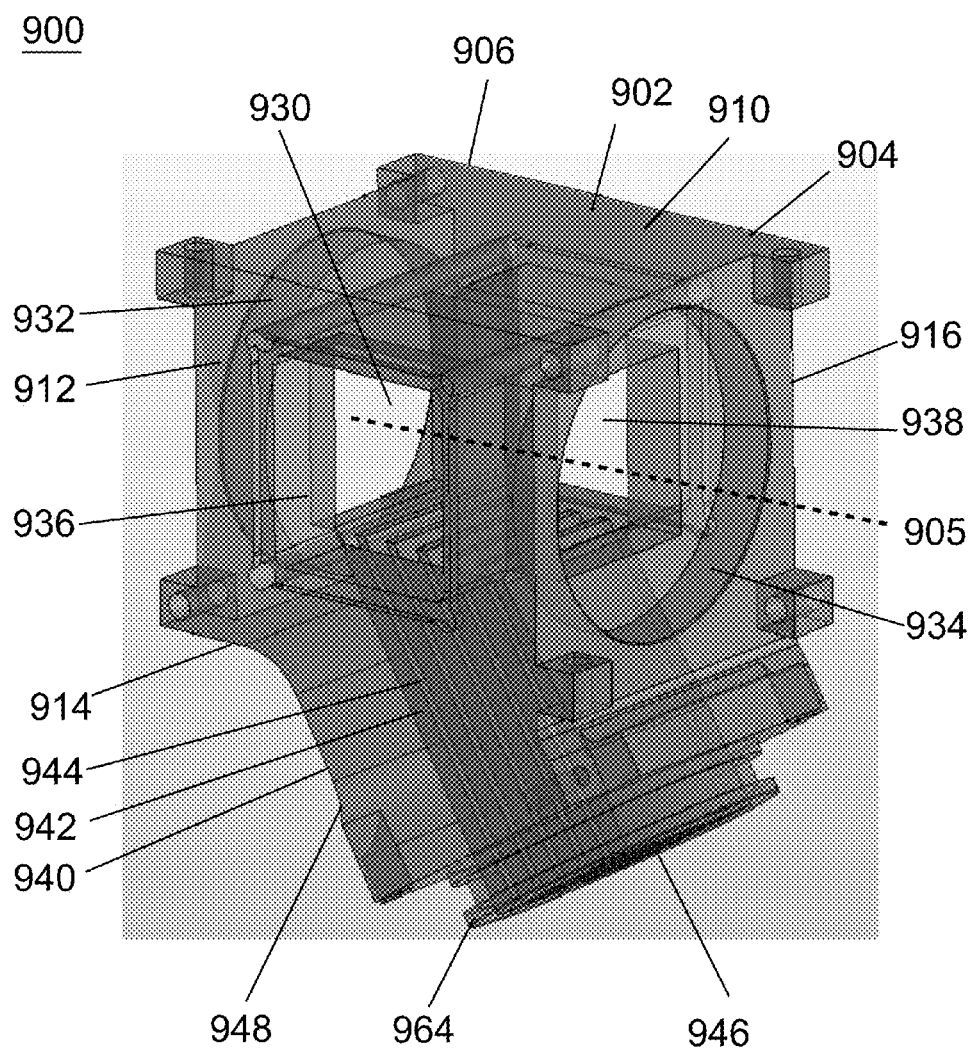
FIG. 3 is a perspective view of a flow chamber that incorporates a separation system formed from baffles.
Figure 4:
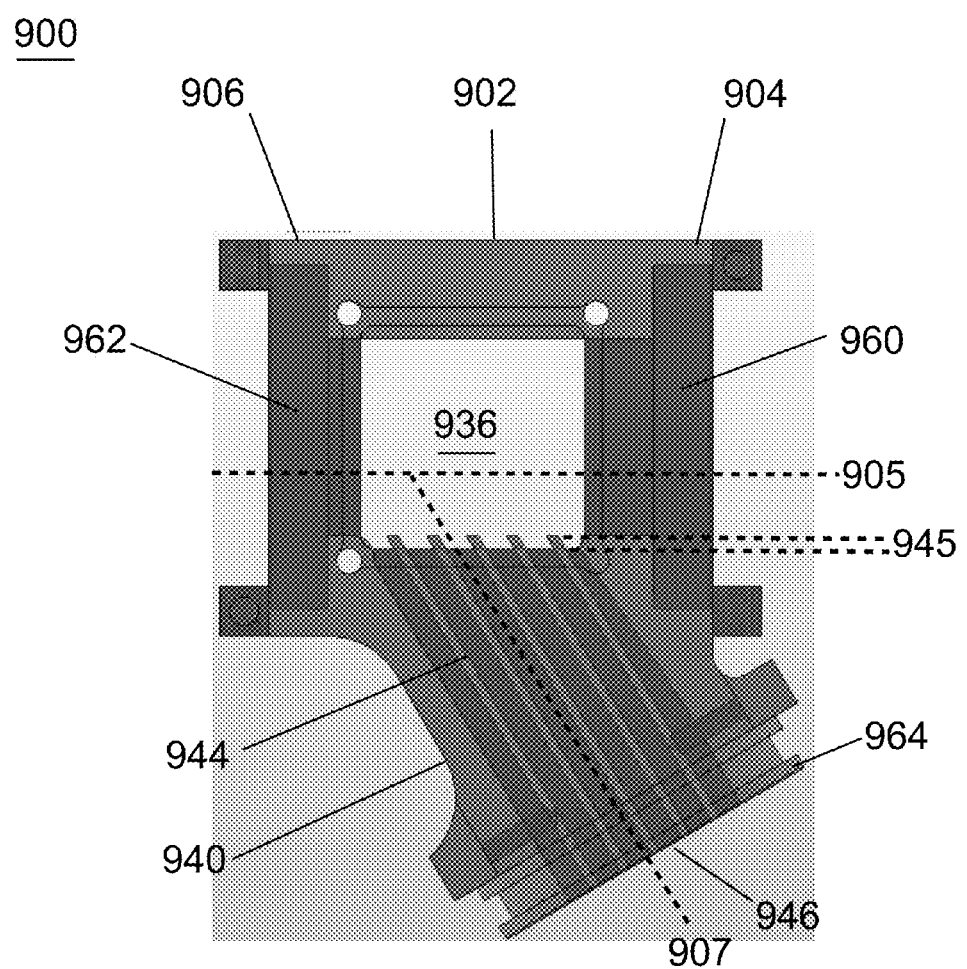
FIG. 4 is a side view of the flow chamber of FIG. 3.

FIG. 3 is a perspective view of an ultrasonic transducer module 900 that incorporates a separation system formed from baffles. FIG. 4 is a side view (y-z plane) of the ultrasonic transducer module of FIG. 3.

This ultrasonic transducer module 900 has a housing 902 with a first end 904, second end 906, and four side walls 910, 912, 914, 916. A primary flow channel 930 is defined between an inlet end and an outlet end, which in this case correspond to the first end and the second end of the housing, as represented by circular openings 932, 934. Put another way, this housing is a flow chamber with an inlet and an outlet. The first end 904 and the second end 906 of the housing can be considered as defining a z-axis. The sides of the housing on which the ultrasonic transducer (not shown) and the reflector (not shown) would be located are represented by square openings 936, 938, and can be considered as defining a y-axis.

In the ultrasonic transducer of FIG. 3, an angled extension 940 extends from a port in one of the sides 910 between the ultrasonic transducer 936 and the reflector 938. A secondary flow channel 942 is present within the angled extension 940, the secondary flow channel connecting to the primary flow channel 930 between the first end 904 and the second end 906 of the module. At least one baffle 944 extends into the primary flow channel 930 to a height 945, as best seen in FIG. 4. The baffle(s) 944 also extend into the secondary flow channel 942. The baffles are flat plates. The baffles 944 lead to a third opening 946 at the distal end 948 of the angled extension 940/secondary flow channel 942. A third attachment member 964 is disposed at the distal end 948 of the angled extension 940. As illustrated in FIG. 4, the first attachment member 960 and the second attachment member 962 are both female members (e.g. a hole), and the third attachment member 964 is a male member (e.g. a tongue).

As seen in FIG. 4, the secondary flow channel 907 is angled relative to the primary flow channel 905 (indicated by dashed lines). The angle between them is from about 15° to 90° (the smaller angle between the two flow channels always being measured), and in particular embodiments is from about 45° to about 75°. Similarly, it can be seen that the baffles 944 are angled relative to the primary flow channel 905, and are not angled relative to the secondary flow channel 907. Put another way, the baffles are substantially parallel to the secondary flow channel.

Figure 5:
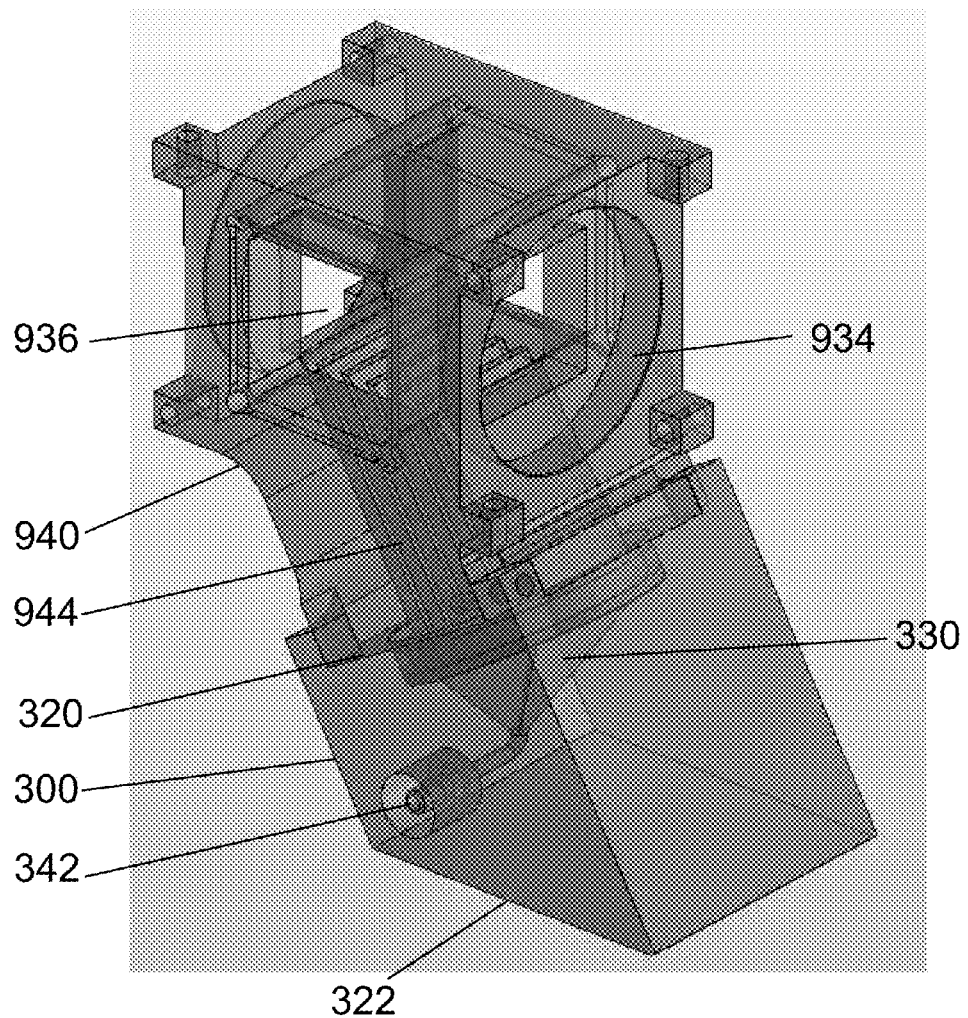
FIG. 5 is a perspective view of the flow chamber of FIG. 3 joined to a collection well having an angled lower end.

In one mode of operation illustrated in FIG. 5, it is contemplated that the ultrasonic transducer module of FIG. 3 will be oriented such that the angled extension 940 acts as a base. The acoustic standing wave field will trap particles and cause aggregation until the particle aggregate is heavy enough for gravity to cause the aggregate to fall downwards and out of the acoustic standing wave field. The aggregate then falls down onto the baffles 944, which acts as a collection surface to guide the aggregate to the collection well module.

FIG. 5 is a perspective view of the ultrasonic transducer module 900 of FIG. 3 joined to a collection well module 300. This collection well module has four side walls, an upper wall 320, a lower wall 322, a well 330, and a port 342. Notably, the lower wall 322 is angled, rather than parallel to the upper wall. The angle of the lower wall is the same as the angle of the angled extension. This provides a flat base for supporting the ultrasonic transducer module.

Figure 6:
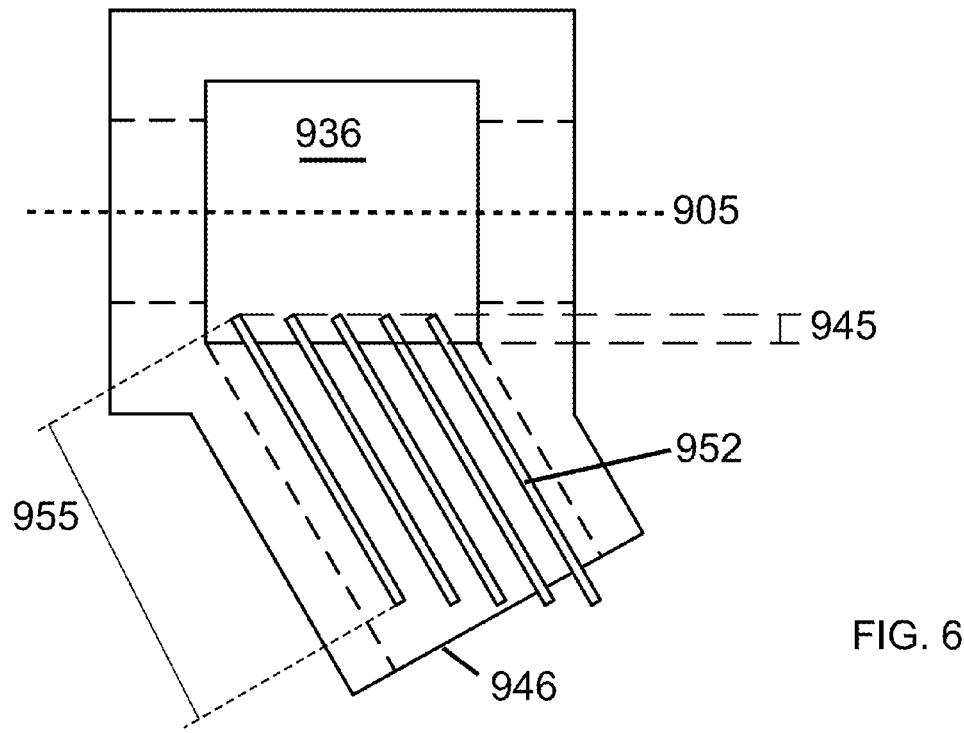
FIG. 6 is a side view of another flow chamber having baffles. The baffles are all of the same length, and are all oriented parallel to each other.
Figure 7:
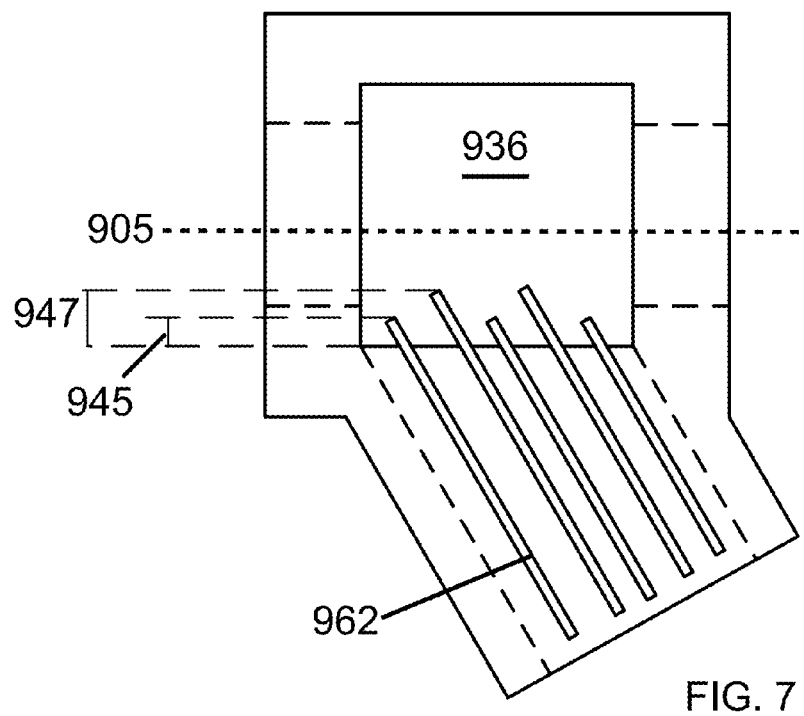
FIG. 7 is a side view of another flow chamber having baffles. These baffles extend into the flow chamber and the primary flow channel in two different distances.
Figure 8:
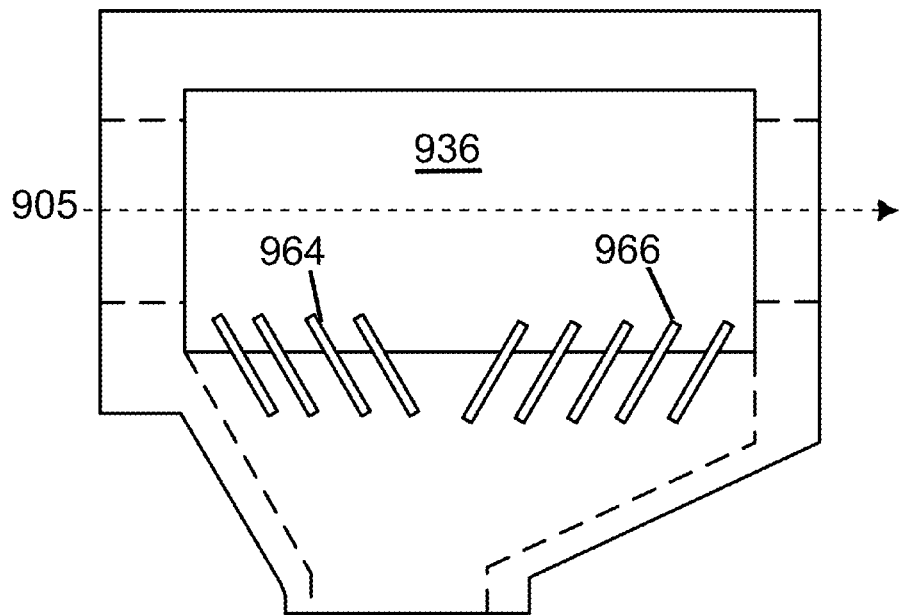
FIG. 8 is a side view of another flow chamber having baffles. The baffles are arranged in at least two different angles relative to the primary flow channel.

FIGS. 6-8 are side views of alternate structures showing some variations of the baffles which are contemplated as being within the scope of the present disclosure. Again, square opening 936 indicates where the transducer would be located. Referring first to FIG. 4, the baffles 944 illustrated here all extend into the primary flow channel for the same distance 945. The baffles 944 also all extend to the third opening 946. As a result, all of the baffles illustrated in FIG. 4 have different lengths (as measured from this side view).

In FIG. 6, the baffles 952 all extend into the primary flow channel 905 for the same distance 945. They are also oriented so that all of the baffles are parallel to each other. However, the baffles all have the same length 955 as well. As a result, as depicted here, some of the baffles may not extend to the third opening 946, and some may extend beyond the third opening 946.

In FIG. 7, the baffles are divided into two different sets of baffles. Some of the baffles 962 extend into the primary flow channel 905 for a first distance 945, and some of the baffles extend into the primary flow channel 905 for a second distance 947 that is greater than the first distance 945.

Finally, in FIG. 8, the housing is somewhat elongated, which can permit the presence of multiple ultrasonic transducers in opening 936. The baffles in this illustration are not arranged such that all baffles are parallel to each other. A first set of baffles 964 are arranged parallel to each other, and a second set of baffles 966 are arranged parallel to each other. The two sets are at different angles relative to the primary flow channel 905. The angles are measured relative to the direction of flow of the primary flow channel. Thus, for example, here, where the direction of flow is from left to right, the baffles 964 would have an obtuse angle, while the baffles 966 would have an acute angle.

Figure 9:
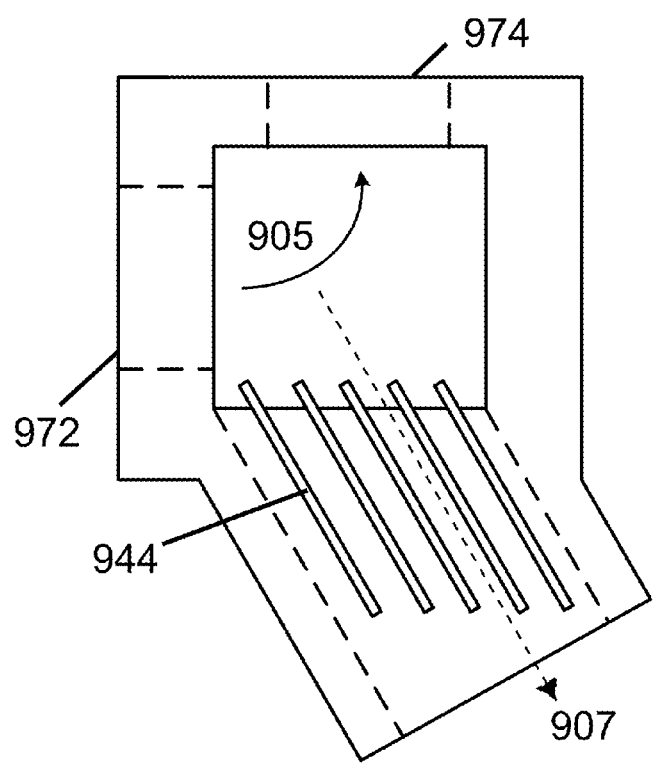
FIG. 9 is a side view of another flow chamber having baffles. Here, the primary flow channel is U-shaped. The inlet and the outlet are on adjacent walls instead of at opposite ends of the flow chamber/housing.

FIG. 9 is a side view of another embodiment. Here, the primary flow channel 930 has a U-turn from inlet end 972 to outlet end 974. An angled extension 940 is still present, with secondary flow channel indicated by arrow 907. Baffles 944 are present extending between the two flow channels.

The acoustophoretic devices discussed above can be made from any suitable material. Such suitable materials include medical grade plastics, such as polycarbonates or polymethyl methacrylates, or other acrylates. It is generally desirable for the material to be somewhat transparent, so that a clear window can be produced and the internal flow channels and flow paths can be seen during operation of the acoustophoresis device/system.

Various coatings may be used on the internal flow channels of the modules. Such coatings include epoxies, for example epichlorohydrin bisphenol crosslinked with an amine or a polyamide; or polyurethane coatings, for example a polyester polyol crosslinked with aliphatic isocyanates. Such coatings are useful for producing a smooth surface and/or reducing surface tension, permitting cells to slide better under the influence of gravity along the flow channel surface and into desired locations (such as collection well modules).

The flow rate of the acoustophoretic device must be controlled so that gravity can act on particle aggregates. In this regard, it is contemplated that the particle/fluid mixture passing in/out of the flow path in the acoustophoretic device through the inlet/outlet modules or the port module can flow at rates of up to about 100 milliliters per minute (ml/min).

By way of comparison, the flow rate out of the collection well modules through the ports is much less, from about 3 ml/min up to about 10 ml/min.

Some explanation of the ultrasonic transducers used in the devices of the present disclosure may be helpful as well. In this regard, the transducers use a piezoelectric crystal, usually made of PZT-8 (lead zirconate titanate). Such crystals may have a 1 inch diameter and a nominal 2 MHz resonance frequency. Each ultrasonic transducer module can have only one crystal, or can have multiple crystals that each act as a separate ultrasonic transducer and are either controlled by one or multiple amplifiers.

Figure 10:
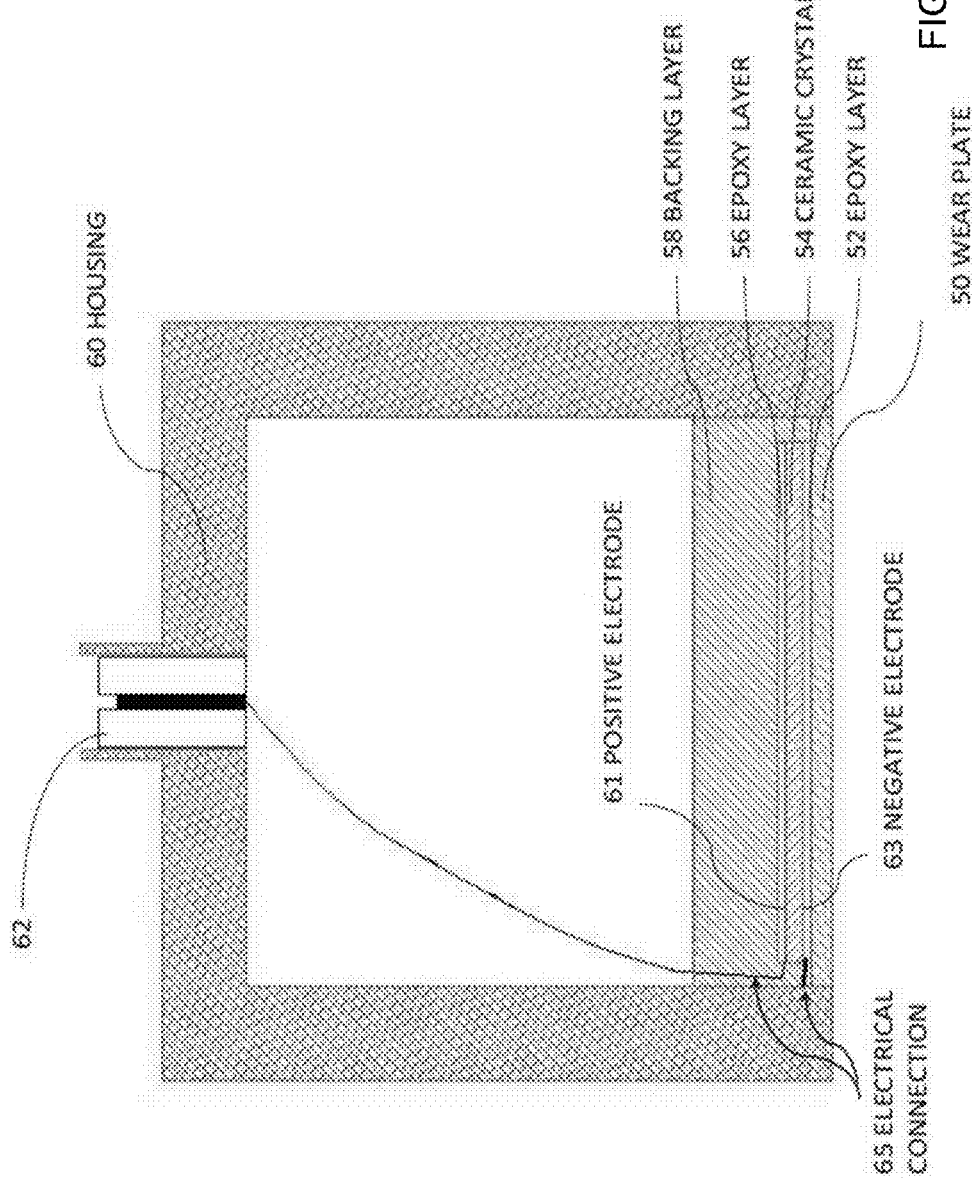
FIG. 10 is a cross-sectional diagram of a conventional ultrasonic transducer.

FIG. 10 is a cross-sectional diagram of a conventional ultrasonic transducer. This transducer has a wear plate 50 at a bottom end, epoxy layer 52, ceramic crystal 54 (made of, e.g. PZT), an epoxy layer 56, and a backing layer 58. On either side of the ceramic crystal, there is an electrode: a positive electrode 61 and a negative electrode 63. The epoxy layer 56 attaches backing layer 58 to the crystal 54. The entire assembly is contained in a housing 60 which may be made out of, for example, aluminum. An electrical adapter 62 provides connection for wires to pass through the housing and connect to leads (not shown) which attach to the crystal 54. Typically, backing layers are designed to add damping and to create a broadband transducer with uniform displacement across a wide range of frequency and are designed to suppress excitation at particular vibrational eigen-modes. Wear plates are usually designed as impedance transformers to better match the characteristic impedance of the medium into which the transducer radiates.

FIG. 11 is a cross-sectional view of an ultrasonic transducer 81 of the present disclosure. Transducer 81 is shaped as a disc or a plate, and has an aluminum housing 82. The piezoelectric crystal is a mass of perovskite ceramic crystals, each consisting of a small, tetravalent metal ion, usually titanium or zirconium, in a lattice of larger, divalent metal ions, usually lead or barium, and $O^{2-}$ ions. As an example, a PZT (lead zirconate titanate) crystal 86 defines the bottom end of the transducer, and is exposed from the exterior of the housing. The crystal is supported on its perimeter by a small elastic layer 98, e.g. silicone or similar material, located between the crystal and the housing. Put another way, no wear layer is present.

Screws 88 attach an aluminum top plate 82a of the housing to the body 82b of the housing via threads. The top plate includes a connector 84 for powering the transducer. The top surface of the PZT crystal 86 is connected to a positive electrode 90 and a negative electrode 92, which are separated by an insulating material 94. The electrodes can be made from any conductive material, such as silver or nickel. Electrical power is provided to the PZT crystal 86 through the electrodes on the crystal. Note that the crystal 86 has no backing layer or epoxy layer. Put another way, there is an air gap 87 in the transducer between aluminum top plate 82a and the crystal 86 (i.e. the air gap is completely empty). A minimal backing 58 and/or wear plate 50 may be provided in some embodiments, as seen in FIG. 12.

The transducer design can affect performance of the system. A typical transducer is a layered structure with the ceramic crystal bonded to a backing layer and a wear plate. Because the transducer is loaded with the high mechanical impedance presented by the standing wave, the traditional design guidelines for wear plates, e.g., half wavelength thickness for standing wave applications or quarter wavelength thickness for radiation applications, and manufacturing methods may not be appropriate. Rather, in one embodiment of the present disclosure the transducers, there is no wear plate or backing, allowing the crystal to vibrate in one of its eigenmodes (i.e. near eigenfrequency) with a high Q-factor. The vibrating ceramic crystal/disk is directly exposed to the fluid flowing through the flow chamber.

Removing the backing (e.g. making the crystal air backed) also permits the ceramic crystal to vibrate at higher order modes of vibration with little damping (e.g. higher order modal displacement). In a transducer having a crystal with a backing, the crystal vibrates with a more uniform displacement, like a piston. Removing the backing allows the crystal to vibrate in a non-uniform displacement mode. The higher order the mode shape of the crystal, the more nodal lines the crystal has. The higher order modal displacement of the crystal creates more trapping lines, although the correlation of trapping line to node is not necessarily one to one, and driving the crystal at a higher frequency will not necessarily produce more trapping lines.

In some embodiments, the crystal may have a backing that minimally affects the Q-factor of the crystal (e.g. less than 5%). The backing may be made of a substantially acoustically transparent material such as balsa wood, foam, or cork which allows the crystal to vibrate in a higher order mode shape and maintains a high Q-factor while still providing some mechanical support for the crystal. The backing layer may be a solid, or may be a lattice having holes through the layer, such that the lattice follows the nodes of the vibrating crystal in a particular higher order vibration mode, providing support at node locations while allowing the rest of the crystal to vibrate freely. The goal of the lattice work or acoustically transparent material is to provide support without lowering the Q-factor of the crystal or interfering with the excitation of a particular mode shape.

Placing the crystal in direct contact with the fluid also contributes to the high Q-factor by avoiding the dampening and energy absorption effects of the epoxy layer and the wear plate. Other embodiments may have wear plates or a wear surface to prevent the PZT, which contains lead, contacting the host fluid. This may be desirable in, for example, biological applications such as separating blood. Such applications might use a wear layer such as chrome, electrolytic nickel, or electroless nickel. Chemical vapor deposition could also be used to apply a layer of poly(p-xylylene) (e.g. Parylene) or other polymers or polymer films. Organic and biocompatible coatings such as silicone or polyurethane are also usable as a wear surface.

Figure 13:
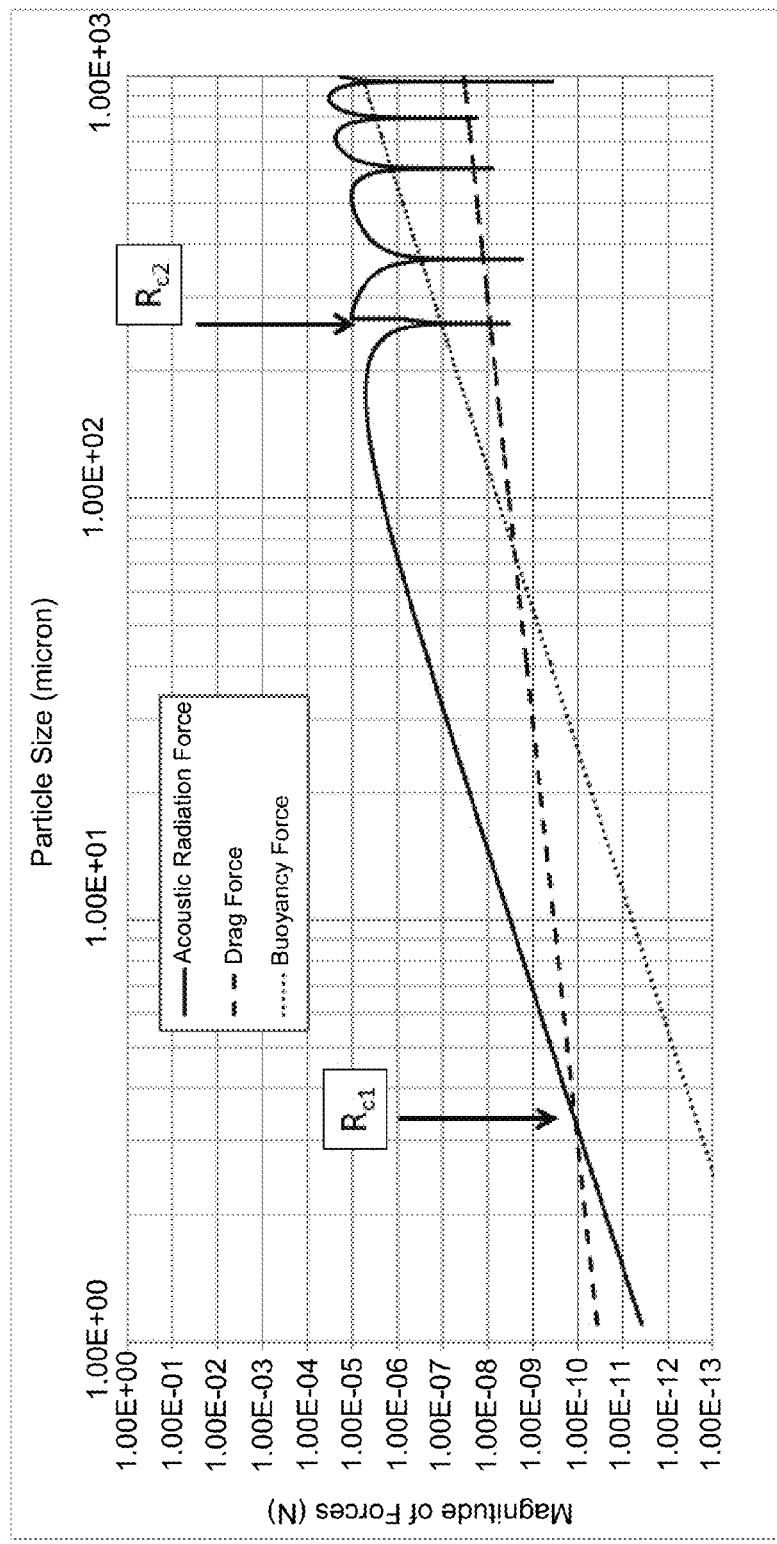
FIG. 13 is a graph showing the relationship of the acoustic radiation force, buoyancy force, and Stokes' drag force to particle size. The horizontal axis is in microns (µm) and the vertical axis is in Newtons (N).

FIG. 13 is a log-log graph (logarithmic y-axis, logarithmic x-axis) that shows the scaling of the acoustic radiation force, fluid drag force, and buoyancy force with particle radius, and provides an explanation for the separation of particles using acoustic radiation forces. Calculations are done for a typical SAE-30 oil droplet used in experiments. The buoyancy force is a particle volume dependent force, and is therefore negligible for particle sizes on the order of micron, but grows, and becomes significant for particle sizes on the order of hundreds of microns. The fluid drag force (Stokes drag force) scales linearly with fluid velocity, and therefore typically exceeds the buoyancy force for micron sized particles, but is negligible for larger sized particles on the order of hundreds of microns. The acoustic radiation force scaling is different. When the particle size is small, Gor'kov's equation is accurate and the acoustic trapping force scales with the volume of the particle. Eventually, when the particle size grows, the acoustic radiation force no longer increases with the cube of the particle radius, and will rapidly vanish at a certain critical particle size. For further increases of particle size, the radiation force increases again in magnitude but with opposite phase (not shown in the graph). This pattern repeats for increasing particle sizes.

Initially, when a suspension is flowing through the system with primarily small micron sized particles, it is necessary for the acoustic radiation force to balance the combined effect of fluid drag force and buoyancy force for a particle to be trapped in the standing wave. In FIG. 13 this happens for a particle size of about 3.5 micron, labeled as $R_{c1}$. The graph then indicates that all larger particles will be trapped as well. Therefore, when small particles are trapped in the standing wave, particles coalescence/clumping/aggregation/agglomeration takes place, resulting in continuous growth of effective particle size. As particles cluster, the total drag on all of the particles in the cluster is much lower than the sum of the drag forces on the individual particles. In essence, as the particles cluster, they shield each other from the fluid flow and reduce the overall drag of the cluster. As the particle size grows, the acoustic radiation force reflects off the particle, such that large particles will cause the acoustic radiation force to decrease. The acoustic lateral forces on the particles must be larger than the drag forces for the clusters to remain stationary and grow in size.

Particle size growth continues until the buoyancy force becomes dominant, which is indicated by a second critical particle size, $R_{c2}$, at which size the particles will rise or sink, depending on their relative density with respect to the host fluid. At this size, acoustic forces are secondary, gravity/buoyancy forces become dominant, and the particles naturally drop out of the host fluid. As the particles rise or sink, they no longer reflect the acoustic radiation force, so that the acoustic radiation force then increases. Not all particles will drop out, and those remaining particles will continue to grow in size as well. This phenomenon explains the quick drops and rises in the acoustic radiation force beyond size $R_{c2}$. Thus, FIG. 13 explains how small particles can be trapped continuously in a standing wave, grow into larger particles or clumps, and then eventually will rise or settle out because of increased buoyancy force.

The size, shape, and thickness of the transducer determine the transducer displacement at different frequencies of excitation, which in turn affects particle separation efficiency. Typically, the transducer is operated at frequencies near the thickness resonance frequency (half wavelength). Gradients in transducer displacement typically result in more places for particles to be trapped. Higher order modal displacements generate three-dimensional acoustic standing waves with strong gradients in the acoustic field in all directions, thereby creating equally strong acoustic radiation forces in all directions, leading to multiple trapping lines, where the number of trapping lines correlate with the particular mode shape of the transducer.

Figure 14:
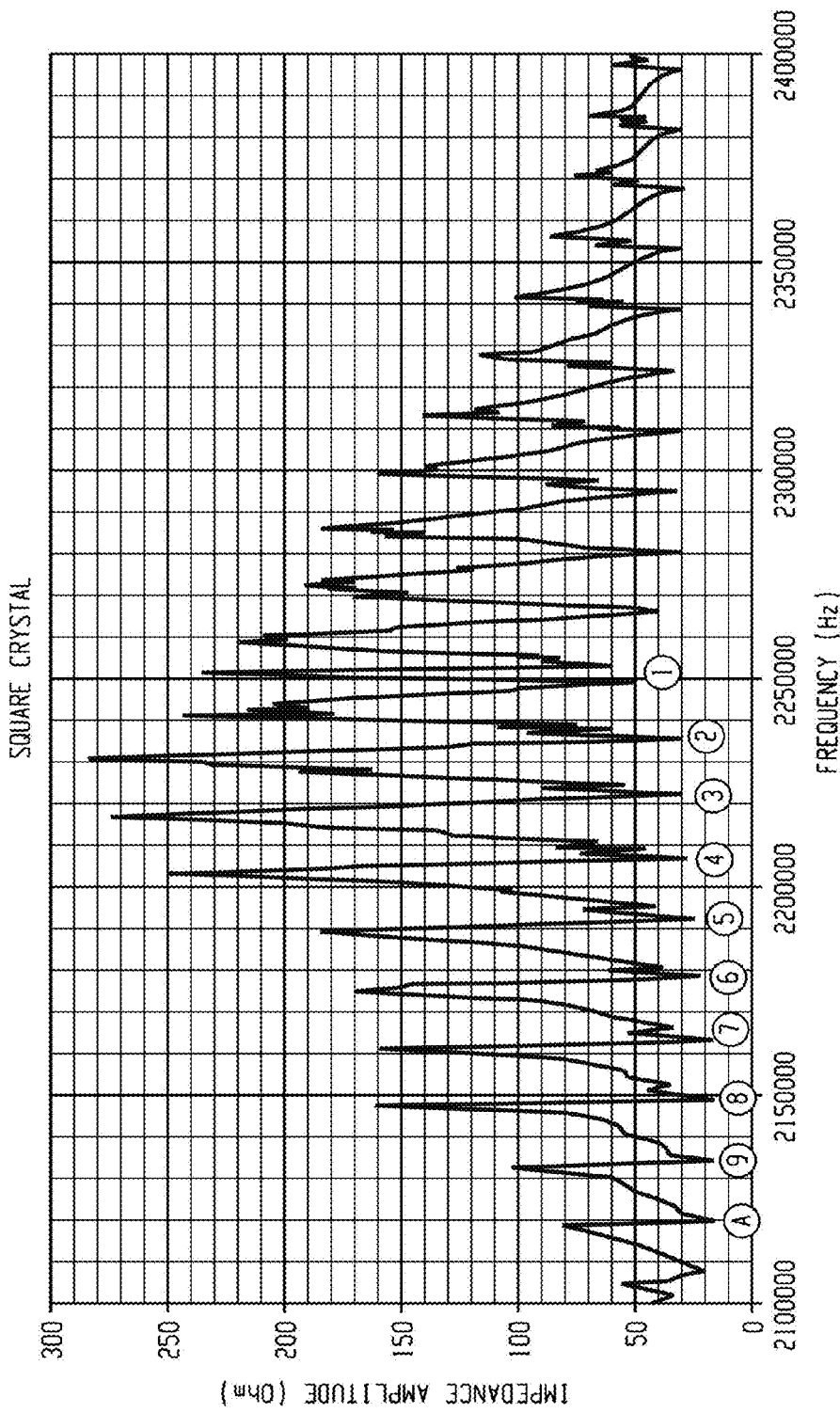
FIG. 14 is a graph of electrical impedance amplitude versus frequency for a square transducer driven at different frequencies.

FIG. 14 shows the measured electrical impedance amplitude of the transducer as a function of frequency in the vicinity of the 2.2 MHz transducer resonance. The minima in the transducer electrical impedance correspond to acoustic resonances of a water column and represent potential frequencies for operation. Numerical modeling has indicated that the transducer displacement profile varies significantly at these acoustic resonance frequencies, and thereby directly affects the acoustic standing wave and resulting trapping force. Since the transducer operates near its thickness resonance, the displacements of the electrode surfaces are essentially out of phase. The typical displacement of the transducer electrodes is not uniform and varies depending on frequency of excitation. As an example, at one frequency of excitation with a single line of trapped particles, the displacement has a single maximum in the middle of the electrode and minima near the transducer edges. At another excitation frequency, the transducer profile has multiple maxima leading to multiple trapped lines of particles. Higher order transducer displacement patterns result in higher trapping forces and multiple stable trapping lines for the captured particles.

To investigate the effect of the transducer displacement profile on acoustic trapping force and particle separation efficiencies, an experiment was repeated ten times, with all conditions identical except for the excitation frequency. Ten consecutive acoustic resonance frequencies, indicated by circled numbers 1-9 and letter A on FIG. 14, were used as excitation frequencies. The conditions were experiment duration of 30 min, a 1000 ppm oil concentration of approximately 5-micron SAE-30 oil droplets, a flow rate of 500 ml/min, and an applied power of 20 W.

As the emulsion passed by the transducer, the trapping lines of oil droplets were observed and characterized. The characterization involved the observation and pattern of the number of trapping lines across the fluid channel, as shown in FIG. 15A, for seven of the ten resonance frequencies identified in FIG. 14.

FIG. 15B shows an isometric view of the system in which the trapping line locations are being determined. FIG. 15C is a view of the system as it appears when looking down the inlet, along arrow 114. FIG. 15D is a view of the system as it appears when looking directly at the transducer face, along arrow 116.

The effect of excitation frequency clearly determines the number of trapping lines, which vary from a single trapping line at the excitation frequency of acoustic resonance 5 and 9, to nine trapping lines for acoustic resonance frequency 4. At other excitation frequencies four or five trapping lines are observed. Different displacement profiles of the transducer can produce different (more) trapping lines in the standing waves, with more gradients in displacement profile generally creating higher trapping forces and more trapping lines.

In the present systems, the system is operated at a voltage such that the particles and particle clusters are trapped in the ultrasonic standing wave. The particles and clusters are collected in well-defined trapping lines. Each trapping line is aligned with the main direction of the acoustic standing wave. Particles and clusters in the trapping lines are separated by half a wavelength. Within each pressure nodal plane of the standing wave, the particles are trapped at very specific points, typically the minima of the acoustic radiation potential. The axial component of the acoustic radiation force drives the particles, with a positive contrast factor, to the pressure nodal planes, whereas particles with a negative contrast factor are driven to the pressure anti-nodal planes. The radial or lateral component of the acoustic radiation force is the force that traps the particles in the standing wave, clumps or clusters them into tightly packed clusters, which then gravity separate when the clusters reach a critical size. In systems using typical transducers, the radial or lateral component of the acoustic radiation force is typically several orders of magnitude smaller than the axial component of the acoustic radiation force. It therefore has two limitations. It has very weak trapping capabilities of particles and moreover, it cannot generate tightly enough packed clusters that will separate out due to gravity. The lateral force in the present devices can be significant, on the same order of magnitude as the axial force component, and is sufficient to overcome the fluid drag force at linear velocities of up to 1 cm/s. The strong clustering capability leads to rapid formation of clusters which continuously separate out from the host fluid through gravity/buoyancy separation.

The three-dimensional acoustic standing waves are the result of superposition of the vibration modes of the crystal. Three dimensional force gradients are generated in every nodal plane of the standing wave. Multiple particle clusters are formed along a line in the axial direction of the standing wave, as illustrated in FIG. 15B. For optimum collection, the shape of the particle clusters should give the lowest drag. At particle Reynolds numbers below 20, cylindrical shapes have significantly lower drag coefficients than spheres. Cylinders can also carry significantly more particles (mass) for a given surface area, so that a cylindrical particle cluster will have higher gravity/buoyancy forces and lower resistance drag than a spherical particle cluster. Thus a cylindrical particle cluster will drop out faster than other shapes. It is noted that "cylinder" is used as a shorthand for describing the shape of such clusters, which may perhaps be better described as being ellipsoidal.

Figure 16A:
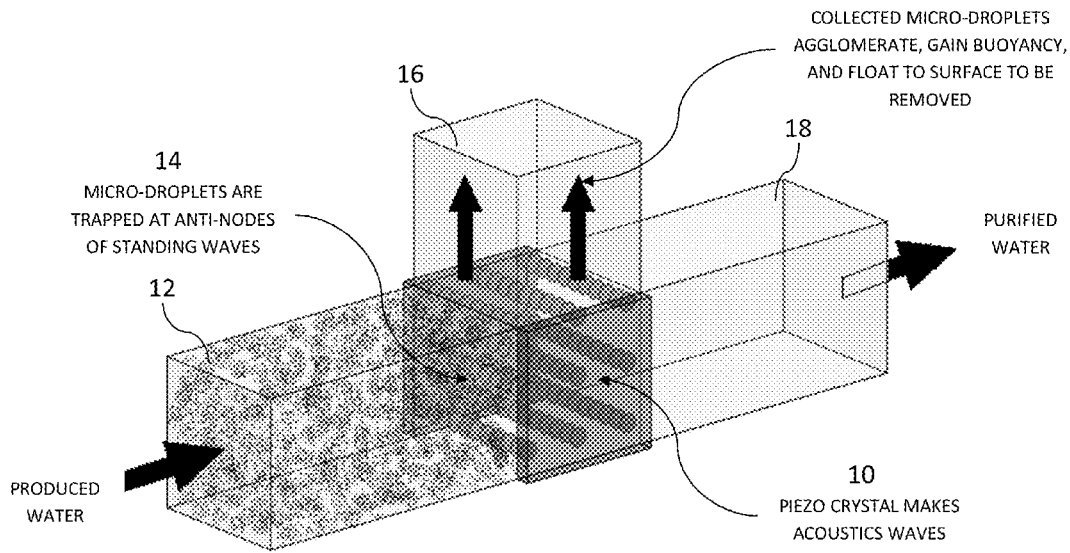
FIG. 16A is a diagram illustrating the function of an acoustophoretic separator with a second fluid or particulate less dense than the host fluid.
Figure 16B:
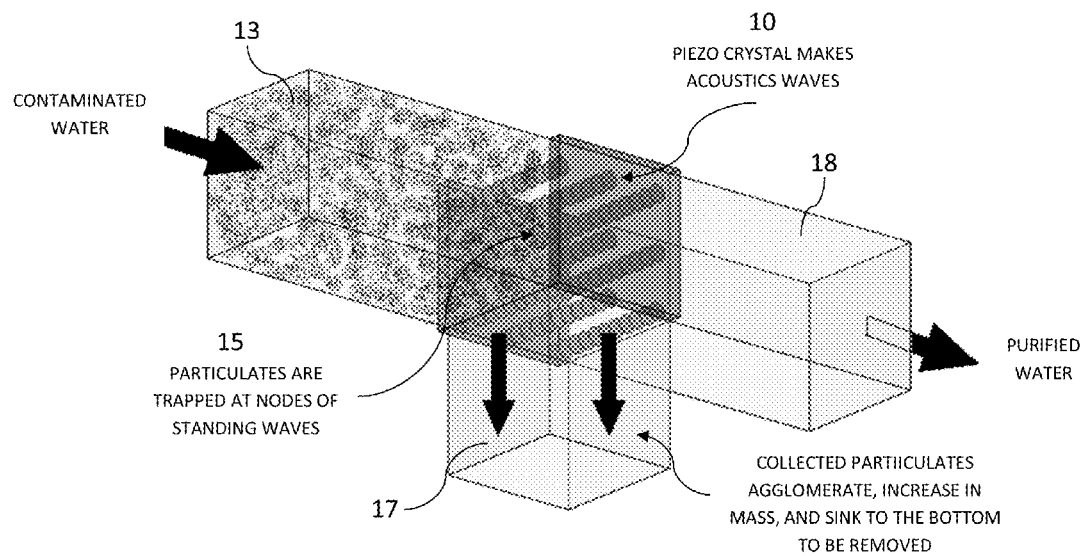
FIG. 16B is a diagram illustrating the function of an acoustophoretic separator with a second fluid or particulate denser than the host fluid.

The overall system thus operates as shown in FIG. 16A (for fluids/particles that are less dense than the host fluid) and FIG. 16B (for fluids/particles that are more dense than the host fluid). One or more standing waves are created between the transducer 10 and the reflector 11. The particles 12 are trapped in standing waves at the pressure anti-nodes 14 where they agglomerate, aggregate, clump, or coalesce into larger clusters of particles. For buoyant materials as in FIG. 16A, the clusters float to the surface and are discharged via an effluent outlet 16 located above the flow path. In the case of heavier materials as in FIG. 16B, the clusters sink to the bottom and are discharged via an effluent outlet 17 located below the flow path. Clarified water is discharged at outlet 18.

Referring now to FIG. 16B, at low particle Reynolds numbers (~1), particle clusters will drop dramatically in the acoustic chamber because inertial effects are negligible and gravity forces are dominant. As a result, the clusters drop downwards at very high velocities, and the lower density clarified fluid rises due to conservation of mass flow. As a result, the nodes formed by the acoustic standing wave that are located near the top of the acoustic chamber will not become filled up as quickly as the lower nodes, and will not drop as quickly. In addition, the nodes/clusters near the bottom of the chamber will be disrupted by falling clusters. These effects result in lower separation efficiency/performance. Thus, changing the flow dynamics can help to improve performance of the acoustophoresis device.

Figure 17:
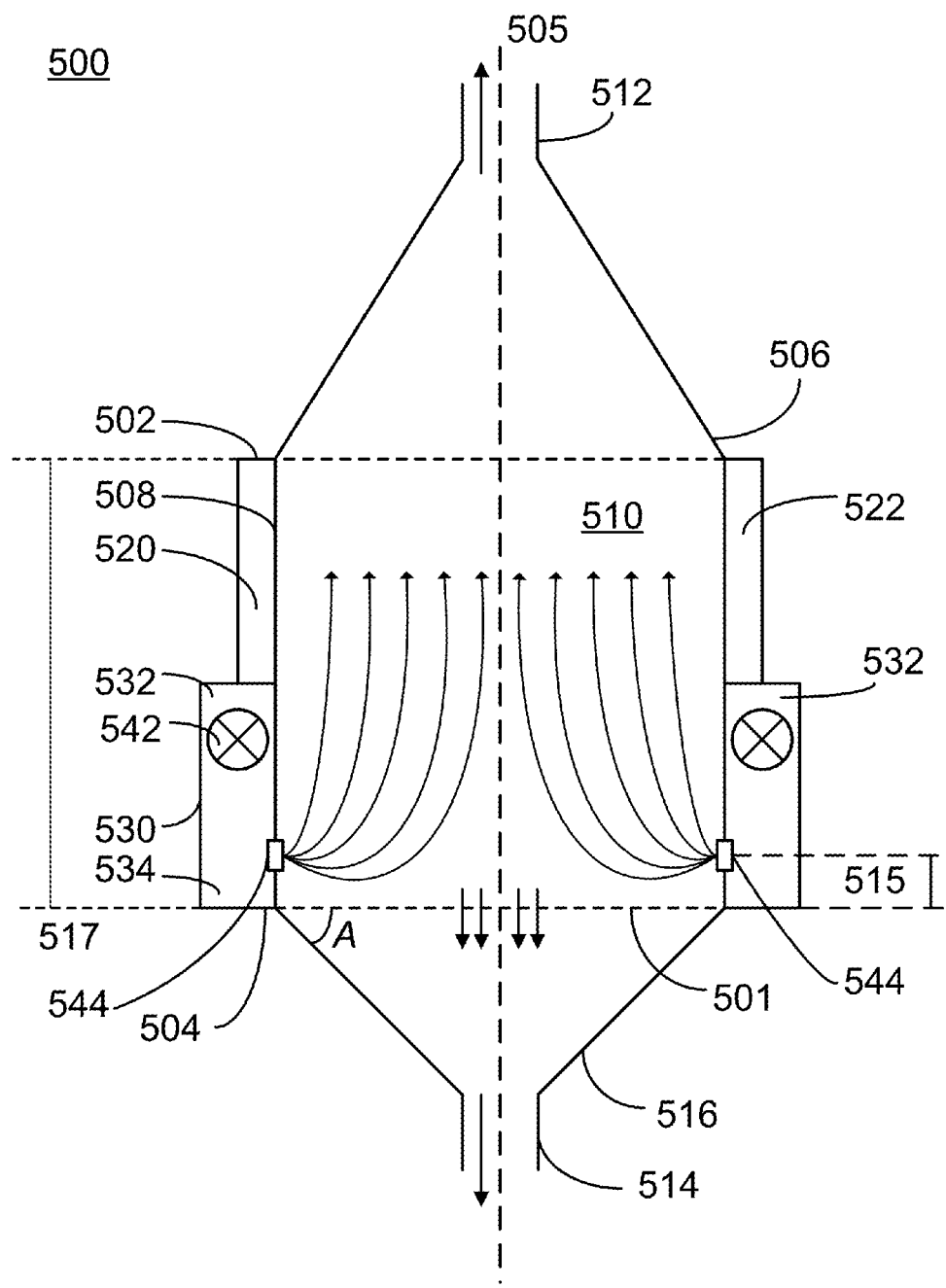
FIG. 17 is a cross-sectional diagram of an acoustophoretic device including opposing flow inlets generating flow symmetry and more uniform velocities.
Figure 18:
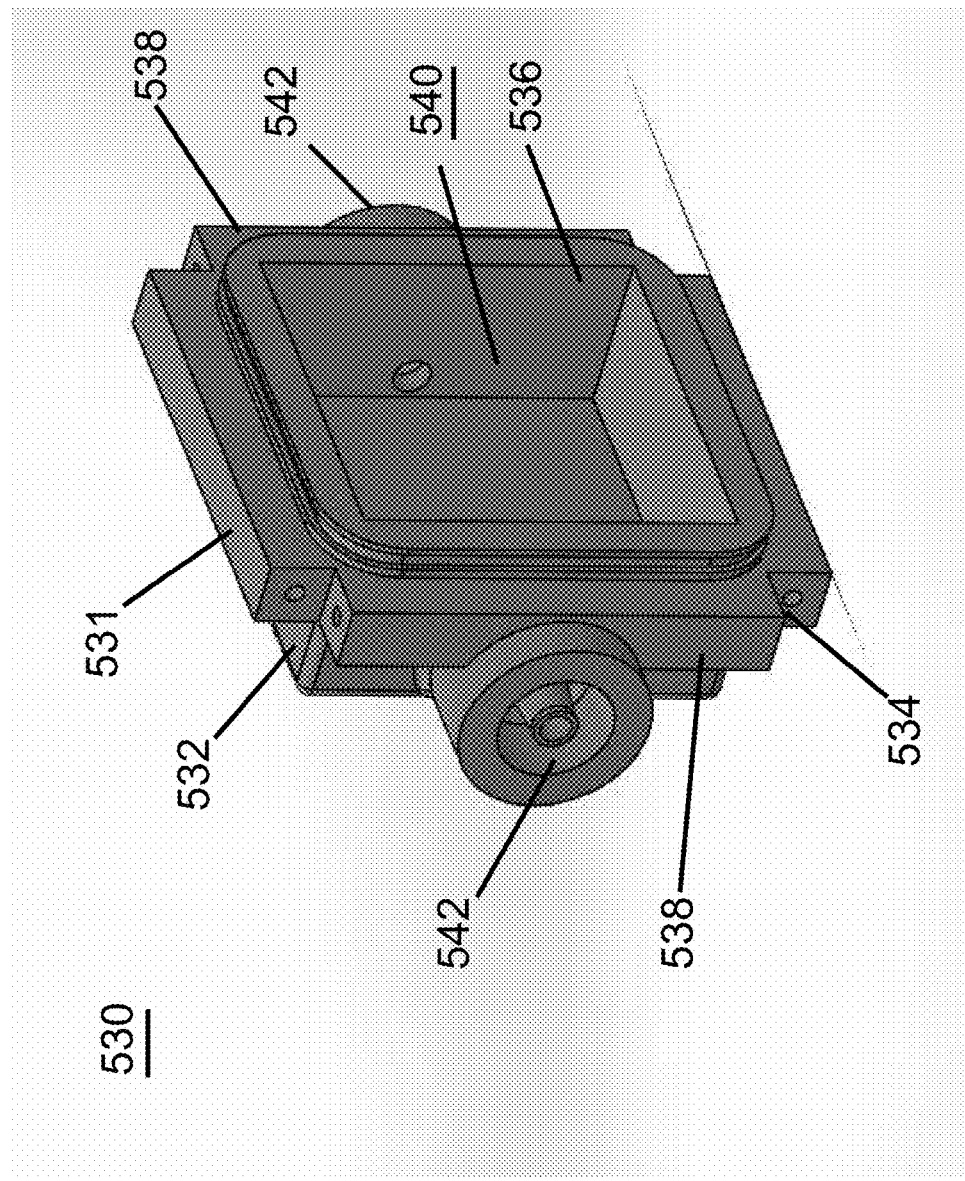
FIG. 18 is a perspective view of the plenum/housing/chamber of an exemplary inlet dump diffuser, with the front plate removed so that the interior of the dump diffuser can be seen.
Figure 19:
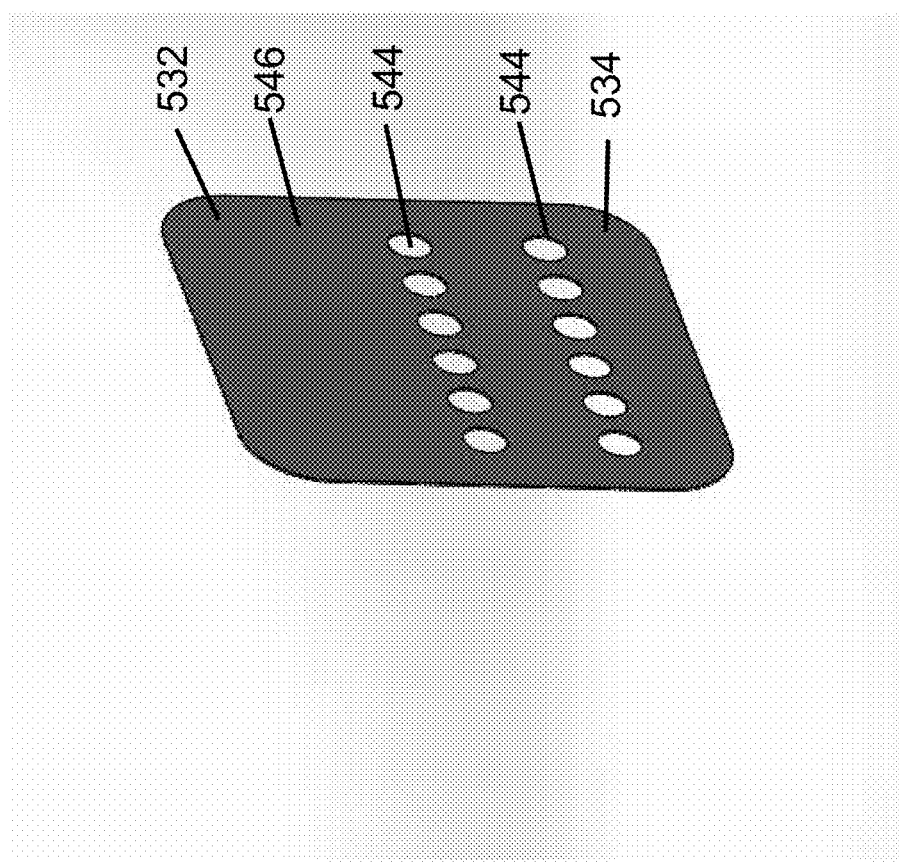
FIG. 19 is a perspective view of the front plate that is used with the plenum of FIG. 18.

FIG. 17 is a cross-sectional diagram of a configuration for an acoustophoretic device that can be used to ameliorate some of the problems with a fluid at low particle Reynolds numbers, and create a more uniform flow through the device. The device 500 has upward, vertical flow through the acoustic chamber with an upper end 502 and a lower end 504. The acoustic chamber also has two opposing dump inlets and a collector design which provides a vertical plane or line of flow symmetry 505. Generally, the cross-section of the device in the flow direction is circular or rectangular. The device is formed from a housing 506 having a sidewall 508 that defines an acoustic chamber 510 therein. The acoustic chamber is empty, i.e. there is nothing within the chamber, and fluid flows through the acoustic chamber. At least one upper outlet 512 is present at the upper end of the acoustic chamber 510. At least one collector outlet 514 is present at the lower end 504 of the acoustic chamber. A shallow wall 516 is present at the lower end of the acoustic chamber, and leads to the outlet 514. The shallow wall has an angle when measured relative to a horizontal plane (denoted here by the chamber bottom, line 501), with the angle A being in embodiments about 60° or less, including about 30° to about 45°. At least one ultrasonic transducer 520 is present on the sidewall 508, and at least one reflector 522 is present on the sidewall 508 opposite the ultrasonic transducer 520. The transducer 520 and the reflector 522 are located closer to the upper end 502 of the device.

This device 500 includes a symmetrical, dual dump diffuser, plenum inlet configuration. Here, two dump diffusers 530 are placed on opposite sides of the device. Each dump diffuser has a plenum/chamber with an upper end 532 and a lower end 534. The plenum volume provides flow diffusion and dramatically reduces incoming flow non-uniformities. An inlet flow port 542 is located at the upper end 532, and at least one flow outlet 544 is located at the lower end of the plenum. These plenum flow outlets 544 also pass through the acoustic chamber sidewall 508, and can be considered flow inlets into the acoustic chamber. These acoustic chamber flow inlets can be in the form of slots or a line of holes, and they are placed above the bottom of the acoustic chamber. In embodiments, the acoustic chamber inlets are located above the chamber bottom 501 at a height 515 that is between 0% and 100% of the height 517 of the acoustic chamber, and more particularly between 5% and 25% of the height of the acoustic chamber. The diffuser outlets 544 provide a flow direction normal to the axial direction of the acoustic standing waves generated by the ultrasonic transducer. The acoustic chamber inlets are also arranged so that they are in opposing locations, so that the horizontal velocity will decrease to zero in the center of the acoustic chamber.

Each dump diffuser includes an entrance port 542 into which the mixture of host fluid/second fluid or particulate flows (the X refers to the flow direction into the paper). This eliminates downward flow in the acoustic chamber. The mixture fills up the plenum in the dump diffuser and then flows horizontally into the acoustic chamber inlets 544 and enters the acoustic chamber, where the mixture flows vertically upwards and out of the upper outlet 512. The dump diffuser reduces/eliminates flow pulsations and flow non-uniformities that result from pumps, hosing and horizontal inlet flow where gravity effects dominate. The acoustic chamber inlets 544 then bring the heavier mixture into the acoustic chamber above the bottom of the chamber (line 501) and below the ultrasonic transducer and the nodal clusters that form in the ultrasonic standing waves. This minimizes any disturbances of the clusters set up by inflowing material.

The vertical plane or line of symmetry 505 is aligned with gravity forces. Also shown are flow streamlines which are desirably symmetrical, since this minimizes non-uniformities, eddy disturbances, circulation, and disturbance of clusters falling through outlet 514 to be collected. Symmetry also maximizes gravity forces in the inlet flow distribution and particle collection process. Because it is heavier than the permeate exiting at the top of the device, the (relatively) heavy incoming mixture comes in near the bottom of the acoustic chamber, spreads out across the bottom of the chamber due to gravity forces, and provides near uniform velocity profiles from bottom to top. The horizontal velocity of the mixture will decrease to zero as it approaches the center of the acoustic chamber due to the dual opposing inlet flows. This assures minimum interference between the chamber flow and dropping particle clusters. A uniform velocity provides the best separation and collection results because the lateral acoustic forces have to overcome particle drag for the clusters to grow and continuously drop out of the acoustic chamber. This also eliminates the need for an inlet flow distributor.

As the particle clusters drop out, the axial acoustic forces associated with the standing wave will keep the clusters intact. This assures rapid dropping of the clusters with high terminal velocities, on the order of 1 cm/sec. This is extremely fast compared to the chamber flow velocities, which are on the order of 0.1 cm/sec to 0.3 cm/sec. The shallow wall angle means the cylindrical particle clusters have to drop only a very short distance before they exit the acoustic chamber, so that little dispersion of the clusters occurs. Ideally, the system operates with 3 to 12 crystal vibration nodes per square inch of transducer. The symmetry, minimum flow disturbance in the central collection region, and shallow collector walls provide good collection without the need for baffles/laminar plates.

FIG. 18 and FIG. 19 provide additional detail on the dump diffusers that are used for providing a more uniform flow of the mixture of host fluid and particulate into the acoustic chamber 510. FIG. 18 is a perspective view with the front plate removed, showing both the interior and the exterior of a dump diffuser. FIG. 19 is a perspective view of the front plate of the dump diffuser. Starting with FIG. 18, the dump diffuser 530 includes a plenum 531 having an upper end 532, an opposite lower end 534, two side faces 538, and a front face 536. A hollow chamber 540 is present within the housing 531. The dump diffuser also includes an entrance port 542 that receives the mixture and leads into the chamber 540. The entrance port 542 is present on the upper end and on a side face 538 of the housing; two entrance ports are visible here. FIG. 19 is a picture of the front plate 546 which is attached to the front face 536 of the housing. As illustrated here, the plenum outlet 544 is located on the lower end 534 and is in the form of two lines of holes, though these could also be in the form of a thin slot. In use, the mixture of host fluid/second fluid or particulate enters through entrance ports 542 and fills up the chamber 540. Pressure then pushes the mixture uniformly out through outlets 544.

FIG. 20 illustrates an embodiment that includes a single dump diffuser 530 and baffles 944. Here, the device 500 includes an upper outlet 512 and a lower outlet 514. The lower outlet 514 is present at the end of the secondary flow channel 907. Box 936 indicates the location of the ultrasonic transducer and the reflector. The dump diffuser 530 is on one side of the acoustic chamber, and has little to no vertical flow component. The incoming mixture is introduced at the bottom of the chamber, and flows horizontally through diffuser outlets 544 to fill the chamber from the bottom up, to create a uniform upwards flow of the mixture. There may be high horizontal velocities near the bottom of the chamber. The baffles 944 may be useful in reducing interference between the horizontal flow and the clusters dropping out of the acoustic standing wave. The permeate exits through upper outlet 512.

FIG. 21 and FIG. 22 are different views of a flow distributor that can be used with the acoustic chamber having downward flow into the chamber (U design). The flow distributor includes an inlet 552 into the entrance end 553 of a plenum 554. Opposite the entrance end is the far end 555 of the plenum, which is closed. As better seen in FIG. 22, the plenum is shaped so that its cross-sectional area decreases from the entrance end 553 to the far end 555. A plurality of diffusers 558 are attached to the bottom side of the plenum 554. As seen in FIG. 21, the diffusers are arranged in a 3×9 array. The plenum is shaped to maximize uniform flow through each diffuser 558. As better seen in FIG. 22, the proximal end 557 of each diffuser joins the plenum, and the distal end 559 of each diffuser joins a sleeve 560, which can also be considered a diffuser inlet. The cross-sectional area of the diffuser increases from the proximal end 557 to the distal end 559. The flow through the diffusers is very uniform. FIG. 23 is a graph showing the velocity vs. position of a flow distributor, with zero (0) being near the entrance end and one (1) being near the far end. As seen here, the flow across the nine diffusers is very uniform, with the velocity ranging between 0.011 and 0.013 m/s.

The flow distributors of FIG. 21 and FIG. 22 can be used to provide a uniform feed in the device of FIG. 2. This is illustrated in FIG. 24. Here, the inlet of the device 500 includes a flow distributor 550. The device contains a wall 440 that separates the inlet 552 and the upper outlet 512. The mixture first flows into the flow distributor 550, which spreads the mixture across the entire inlet duct/flow path to create a uniform downward flow of the mixture of host fluid and particulate to enhance collection efficiency when the mixture flows past the ultrasonic transducer 520 and the reflector 522. The flow path is substantially U-shaped, containing a vertical downwards flow from the flow distributor 550, then a horizontal flow and a vertical upwards flow to the upper outlet 512. The large particle clusters again fall onto the shallow wall 516 and exit through lower outlet 514. The permeate exits through upper outlet 512.

In embodiments, the pulsed voltage signal driving the transducer can have a sinusoidal, square, sawtooth, or triangle waveform; and have a frequency of 500 kHz to 10 MHz. The pulsed voltage signal can be driven with pulse width modulation, which produces any desired waveform. The pulsed voltage signal can also have amplitude or frequency modulation start/stop capability to eliminate streaming.

The transducer(s) is/are used to create a pressure field that generates forces of the same order of magnitude both orthogonal to the standing wave direction and in the standing wave direction. When the forces are roughly the same order of magnitude, particles of size 0.1 microns to 300 microns will be moved more effectively towards regions of agglomeration ("trapping lines"). Because of the equally large gradients in the orthogonal acoustophoretic force component, there are "hot spots" or particle collection regions that are not located in the regular locations in the standing wave direction between the transducer 240 and the reflector 242. Hot spots are located at the minima of acoustic radiation potential. Such hot spots represent particle collection locations.

The comparisons between numerical and experimental results are excellent for the multidimensional acoustic standing waves of the present disclosure, and demonstrate the accuracy of the models. FIG. 25A shows the acoustic pressure field of a numerical model with two transducers on the right side. A photograph of the trapped oil droplets in the standing wave is shown in FIG. 25B. Both the numerical model and the actual experimental results show identical features.

As discussed above, the lateral force can be increased by driving the transducer in higher order mode shapes, as opposed to a form of vibration where the crystal effectively moves as a piston having a uniform displacement. The types of waves thus generated can be characterized as composite waves, with displacement profiles that are similar to leaky symmetric (also referred to as compressional or extensional) Lamb waves. The waves are leaky because they radiate into the water layer, which result in the generation of the acoustic standing waves in the water layer. Symmetric Lamb waves have displacement profiles that are symmetric with respect to the neutral axis of the piezoelectric element, which causes multiple standing waves to be generated in a 3-D space.

These higher order modes of vibration can include modes (1,1), (1,2), (2,1), (2,2), (2, 3), or (m, n), where m and n are 1 or greater. The acoustic pressure is proportional to the driving voltage of the transducer. The electrical power is proportional to the square of the voltage.

Figure 26A:
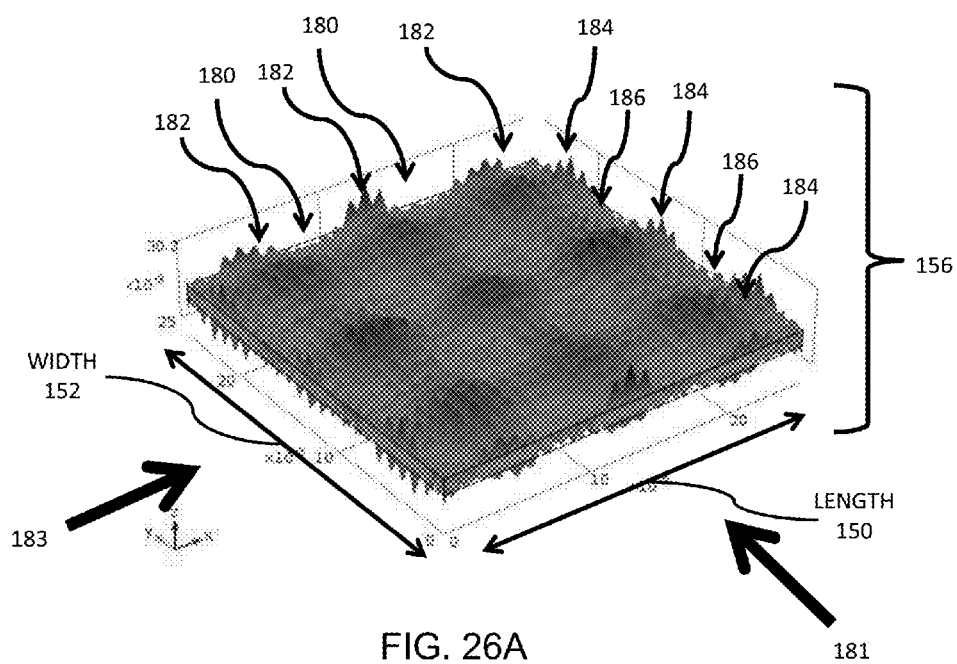
FIGS. 26A-26C illustrate the (3,3) vibration mode of a rectangular plate.
Figure 26B:
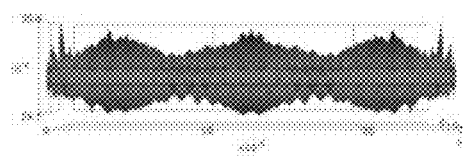
Figure 26C:
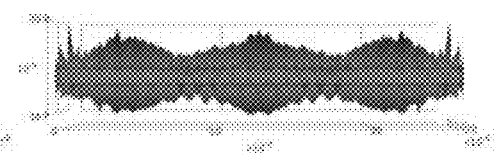

The transducer is typically a thin piezoelectric plate, which is operated in the (3,3) mode, with electric field in the z-axis and primary displacement in the z-axis, as shown in FIGS. 26A-26C. The transducer is typically coupled on one side by air (i.e. the air gap within the transducer) and on the other side by water (i.e. the host fluid). The plate 156 has a length 150 that is equal to or longer than its width 152. A perspective view, a view along the length (y=0), and a view along the width (x=0) are provided. FIG. 26A shows the vibration mode (3,3). There are two lengthwise nodal lines 186 and two width-wise nodal lines 180. Three sets of antinodes 182 are created by the nodal lines 180, and three sets of antinodes 184 are created by the nodal lines 186. This results in a total of nine antinodes resulting from their intersection in each direction. FIG. 26B shows the view along arrow 181 and FIG. 26C shows the view along arrow 183.

In biological applications, it is contemplated that all of the parts of the system (e.g. the acoustic chamber, tubing leading to and from the acoustic chamber, the transducer, dump diffusers, baffles, etc.) can be separated from each other and be disposable. The frequency of the transducers may also be varied to obtain optimal effectiveness for a given power.

The following examples are provided to illustrate the devices and processes of the present disclosure. The examples are merely illustrative and are not intended to limit the disclosure.

EXAMPLES

Figure 20:
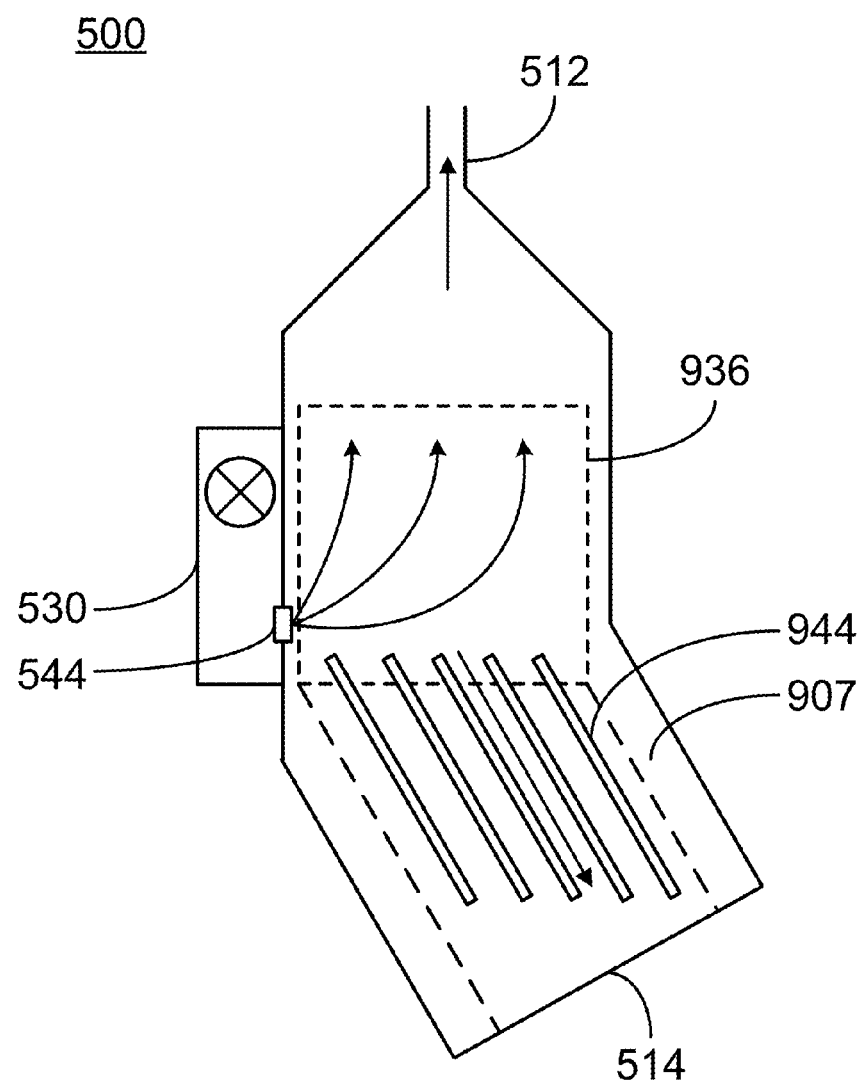
FIG. 20 is a diagram illustrating an acoustic chamber that uses one dump diffuser and baffles to a collection outlet.
Figure 21:
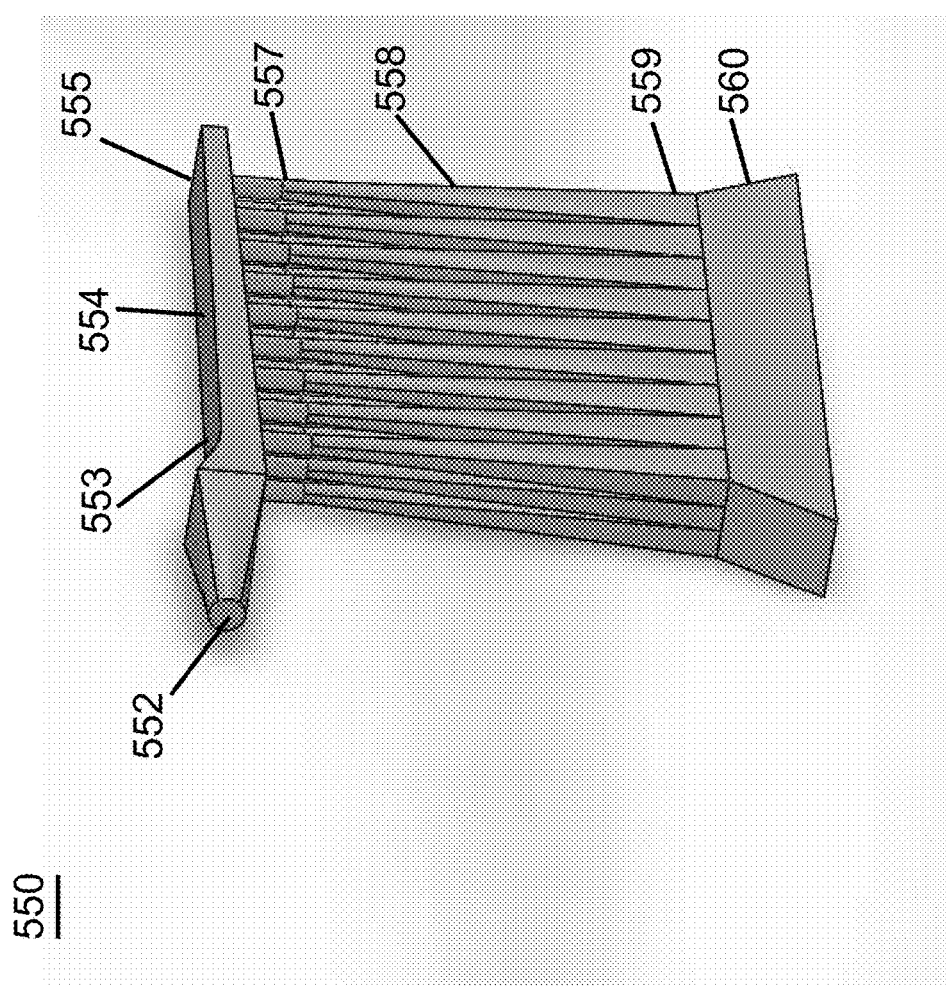
FIG. 21 is a perspective view of a flow distributor.
Figure 22:
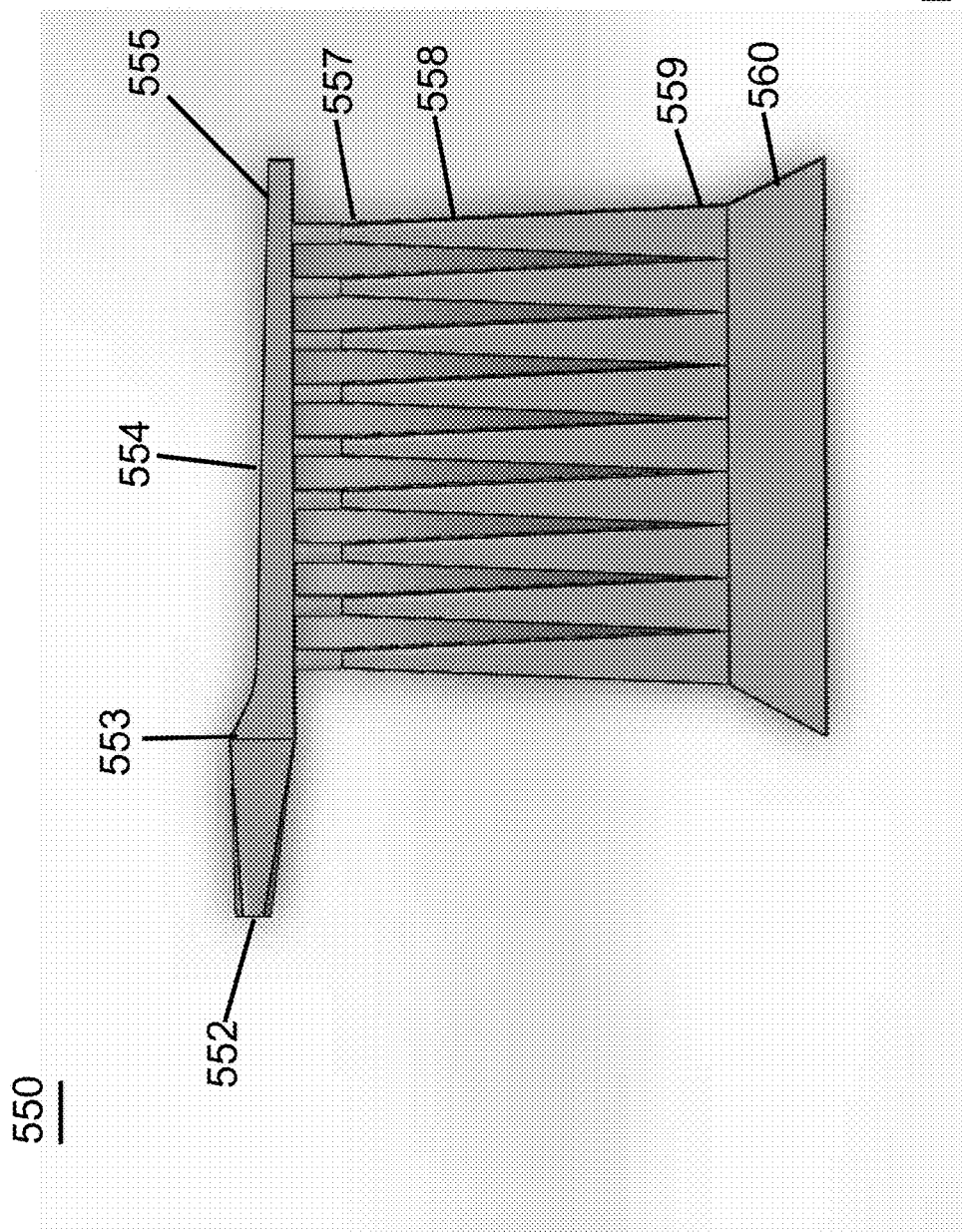
FIG. 22 is a side view of the flow distributor of FIG. 21.
Figure 23:
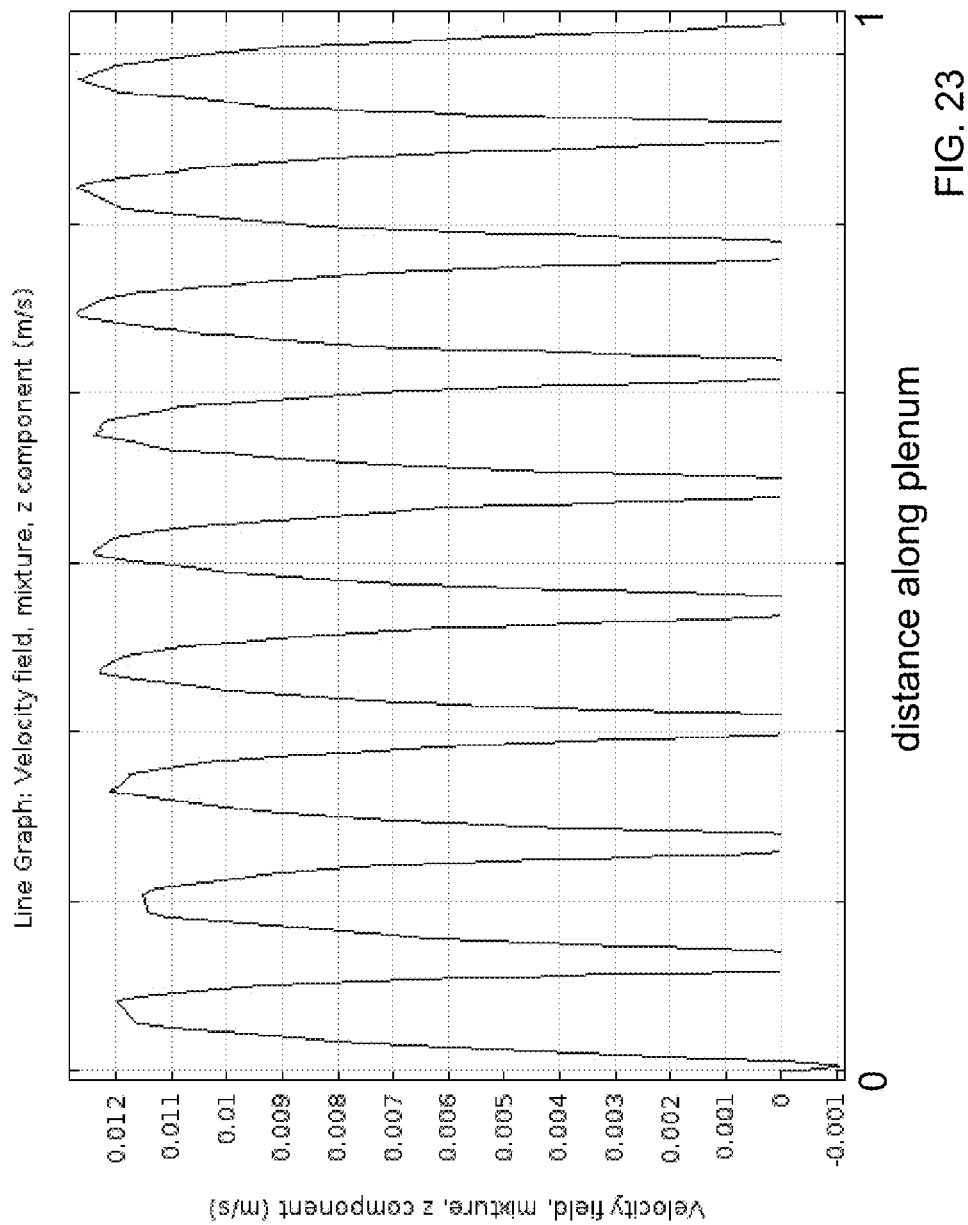
FIG. 23 is a graph illustrating the flow velocity across the diffusers in the flow distributor of FIG. 21.
Figure 24:
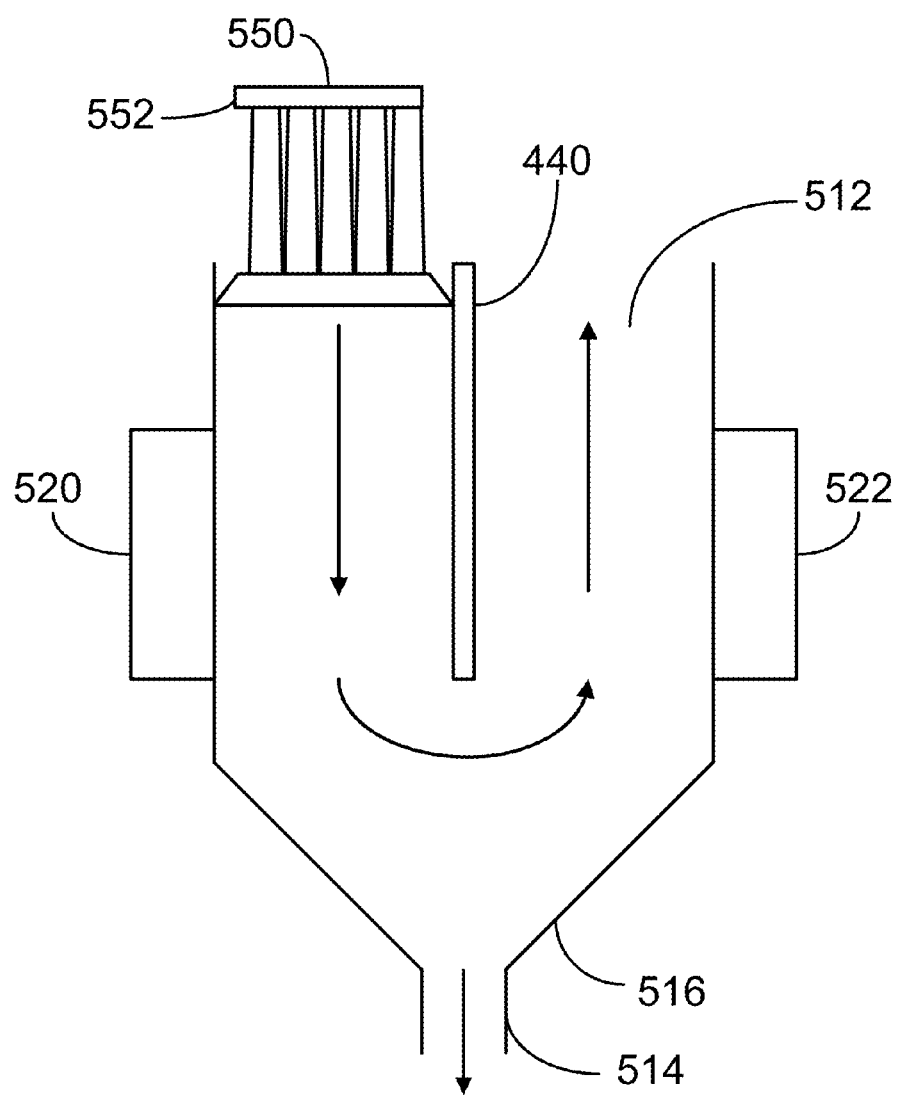
FIG. 24 is a diagram illustrating an acoustic chamber with a U-shaped flow path and a flow distributor (like that of FIG. 22).
Figures 25A, 25B:
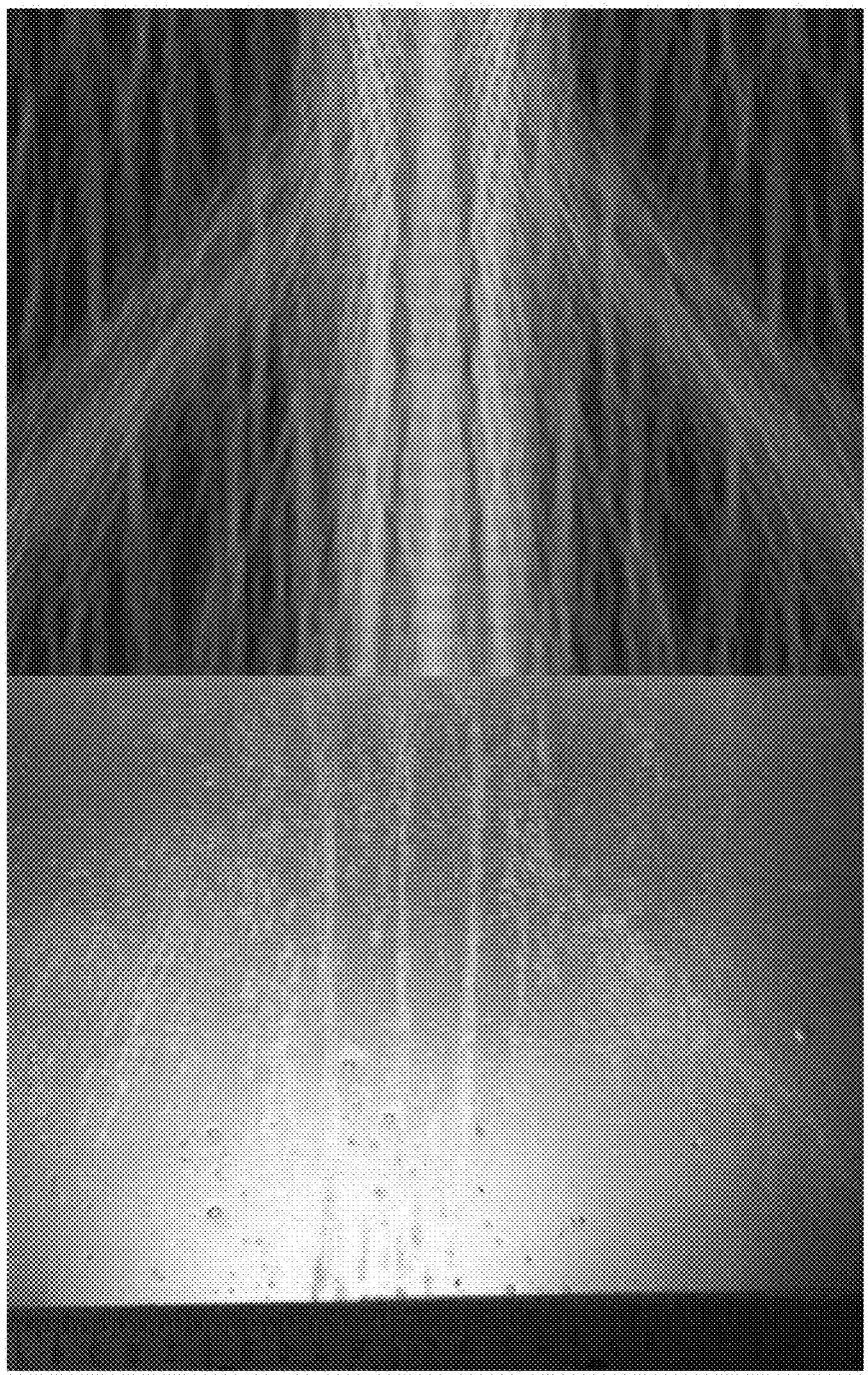
FIG. 25A is a computer simulation of the acoustic pressure amplitude of the ultrasonic waves generated by an array of transducers.
FIG. 25B is a photograph of experimental results showing trapped oil droplets in the standing wave.

Three different devices were made and tested for their cell separation efficiency. The baseline device was similar to FIG. 20, having a single dump diffuser on one side. Second, a device similar to FIG. 17 was used, having two dump diffusers and a shallow wall at an angle of 30 degrees (abbreviated 2DD30). Third, a device similar to FIG. 17 was used, having two dump diffusers and a shallow wall at an angle of 45 degrees (abbreviated 2DD45).

The devices were tested using a 1.5 volume % yeast solution. Each device used two transducers (arranged vertically one on top of the other) with 50 volts to the top transducer and 60 volts to the bottom transducer, operating at a transducer frequency 2.23 MHz. The flowthrough rate was about 270 mL/min, with about 8.1 mL/min concentrate drawoff. The cell separation efficiency was measured as the percentage reduction in turbidity between the feed and the permeate. Table 1 below provides the results:

TABLE 1

| Device | % Clarification |
|---|---|
| Baseline | 90 |
| 2DD30 | 90 |
| 2DD45 | 90 |

Next, the 2DD45 device was tested at different flowrates, and the clarification was again measured. Table 2 shows the results:

TABLE 2

| Flow Rate (mL/min) | % Clarification |
|---|---|
| 135 | 95 |
| 270 | 94 |
| 405 | 91 |
| 540 | 76 |
| 675 | 55 |
| 810 | 48 |

The results in Table 2 showed that good cell separation could be obtained at up to three times the flowrate of the baseline device when using the dual dump diffuser design.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An acoustophoresis device, comprising:
a housing having a sidewall that defines an acoustic chamber;
at least one upper outlet in the acoustic chamber;
a shallow wall leading to at least one lower outlet in the acoustic chamber;
at least one ultrasonic transducer located on the sidewall of the housing;
at least one reflector located on the sidewall of the housing opposite the at least one ultrasonic transducer; and
at least one acoustic chamber inlet above the shallow wall for the inflow of fluid mixture, wherein the at least one acoustic chamber inlet is part of a dump diffuser, the dump diffuser including a plenum with an upper end, a lower end, a chamber with a volume, an inlet flow port at the upper end leading into the chamber, and the at least one acoustic chamber inlet at the lower end.

2. The device of claim 1, wherein the at least one acoustic chamber inlet is located at a height between 5% and 25% of a height of the acoustic chamber.

3. The device of claim 1, wherein the at least one acoustic chamber inlet is in the shape of holes or slots that provide a flow direction normal to the axial direction of an acoustic standing wave generated by the at least one ultrasonic transducer.

4. The device of claim 1, wherein the shallow wall has an angle of 60° or less relative to a horizontal plane.

5. The device of claim 1, having a circular or rectangular cross-section in a flow direction.

6. The device of claim 1, wherein the at least one acoustic chamber inlet is a plurality of inlets located about the housing so that the device has a vertical plane or line of symmetry and the inflow of fluid is symmetrical.

7. The device of claim 6, wherein each inlet in the plurality of acoustic chamber inlets is fed by a different dump diffuser.

8. An acoustophoretic device, comprising:
a housing having a sidewall that defines an acoustic chamber;
at least one upper outlet in the acoustic chamber;
a shallow wall leading to at least one lower outlet in the acoustic chamber;
at least one ultrasonic transducer located on the sidewall of the housing;
at least one reflector located on the sidewall of the housing opposite the at least one ultrasonic transducer; and at least one acoustic chamber inlet for the inflow of fluid mixture;

wherein the at least one acoustic chamber inlet is located at an upper end of the acoustic chamber along with the at least one upper outlet, and a wall separates the at least one acoustic chamber inlet from the at least one upper outlet such that fluid flows vertically downwards from the at least one acoustic chamber inlet past the at least one ultrasonic transducer, then horizontally, then vertically upwards to the at least one upper outlet.

9. The device of claim 8, wherein the wall separating the at least one acoustic chamber inlet from the at least one upper outlet extends vertically downwardly from the upper end of the acoustic chamber.

10. The device of claim 9, wherein the wall separating the at least one acoustic chamber inlet from the at least one upper outlet divides the acoustic chamber into first and second flow channels, the first flow channel defined by the wall and the at least one acoustic chamber inlet and the second flow channel defined by the wall and the at least one upper outlet, wherein the cross-sectional areas of the first and second flow channels are substantially equal.

11. The device of claim 8, wherein the wall separating the at least one acoustic chamber inlet from the at least one upper outlet is spaced apart from the upper end of the acoustic chamber, such that a gap is formed therebetween, the gap acting as a pressure relief passage between the at least one acoustic chamber inlet and the at least one upper outlet.

12. A method of separating a host fluid from a second fluid or particulate, the method comprising flowing a mixture of the host fluid and the second fluid or particulate through an acoustophoresis device in a uniform fashion, the device comprising:
a housing having a sidewall that defines an acoustic chamber;
at least one upper outlet in the acoustic chamber;
a shallow wall leading to at least one lower outlet in the acoustic chamber;
at least one ultrasonic transducer located on the sidewall of the housing, the transducer including a piezoelectric material driven by a voltage signal to create a multi-dimensional acoustic standing wave in the acoustic chamber;
at least one reflector located on the sidewall of the housing opposite the at least one ultrasonic transducer; and
at least one acoustic chamber inlet in the sidewall above the shallow wall for the inflow of fluid, wherein the at least one acoustic chamber inlet is part of a dump diffuser, the dump diffuser including a plenum with an upper end, a lower end, a chamber with a volume, an inlet flow port at the upper end leading into the chamber, and the at least one acoustic chamber inlet at the lower end;

capturing smaller particles of the second fluid or particulate in the multi-dimensional acoustic standing wave to cluster and continuously gravity separate the second fluid or particulate from the host fluid;

wherein the gravity separated second fluid or particulate subsequently falls into the at least one lower outlet.

13. The method of claim 12, wherein the mixture of the host fluid and the second fluid or particulate is a slurry.

14. The method of claim 12, wherein the smaller particles in the incoming mixture have particle Reynolds numbers of from about 0.0005 to 1.

15. The method of claim 12, wherein the particulate is Chinese hamster ovary (CHO) cells, NS0 hybridoma cells, baby hamster kidney (BHK) cells, or human cells.

16. An acoustophoresis device, comprising:
an acoustic chamber;
at least one ultrasonic transducer configured to create a multi-dimensional acoustic standing wave in the acoustic chamber; and
at least one dump diffuser upstream of the acoustic chamber;
wherein the dump diffuser is composed of a plenum, a plenum inlet, and a plenum outlet, wherein fluid flows into the plenum inlet and out of the plenum outlet, and wherein the plenum outlet is fluidly connected to the acoustic chamber.

17. The apparatus of claim 16, where flow pulsations entering the plenum inlet are reduced at the plenum outlet that is fluidly connected to the acoustic chamber.

18. The apparatus of claim 16, where flow non-uniformities entering the plenum inlet are reduced at the plenum outlet that is fluidly connected to the acoustic chamber.

19. The apparatus of claim 16, wherein the horizontal fluid velocity decreases at the center of the acoustic chamber.

20. The apparatus of claim 16, wherein the acoustophoresis device is coupled with at least one additional filtration process upstream or downstream of the acoustophoresis device.

21. The apparatus of claim 20, wherein the at least one additional filtration process is depth filtration, tangential flow filtration, or another physical filtration process.

* * * * *